US008566344B2

(12) United States Patent
Bando et al.

(10) Patent No.: US 8,566,344 B2
(45) Date of Patent: Oct. 22, 2013

(54) DETERMINING WHETHER AN INPUT STRING MATCHES AT LEAST ONE REGULAR EXPRESSION USING LOOKAHEAD FINITE AUTOMATA BASED REGULAR EXPRESSION DETECTION

(75) Inventors: Masanori Bando, Cupertino, CA (US); Nabi Sertac Artan, Brooklyn, NY (US); Hung-Hsiang Jonathan Chao, Holmdel, NJ (US)

(73) Assignee: Polytechnic Institute of New York University, Brooklyn, NY (US)

( * ) Notice: Subject to any disclaimer, the term of this patent is extended or adjusted under 35 U.S.C. 154(b) by 248 days.

(21) Appl. No.: 12/906,316

(22) Filed: Oct. 18, 2010

(65) Prior Publication Data
US 2011/0093496 A1 Apr. 21, 2011

Related U.S. Application Data

(60) Provisional application No. 61/252,651, filed on Oct. 17, 2009.

(51) Int. Cl.
G06F 7/00 (2006.01)
G06F 17/30 (2006.01)

(52) U.S. Cl.
USPC ............................................ 707/769; 726/23

(58) Field of Classification Search
USPC ............................................ 707/769; 726/23
See application file for complete search history.

(56) References Cited

U.S. PATENT DOCUMENTS

| | | | |
|---|---|---|---|
| 6,609,205 B1 * | 8/2003 | Bernhard et al. ............. 726/22 |
| 7,119,577 B2 * | 10/2006 | Sharangpani ................. 326/46 |
| 7,411,418 B2 * | 8/2008 | Gould et al. ................... 326/46 |
| 7,685,637 B2 * | 3/2010 | Zhao et al. ..................... 726/22 |
| 7,689,530 B1 * | 3/2010 | Williams et al. .............. 706/62 |
| 7,702,629 B2 * | 4/2010 | Cytron et al. ............ 707/999.006 |
| 8,180,803 B2 * | 5/2012 | Goyal ........................... 707/798 |
| 8,220,048 B2 * | 7/2012 | Rubin et al. ................... 726/22 |
| 2006/0085389 A1 * | 4/2006 | Flanagan et al. ................ 707/2 |
| 2008/0034427 A1 * | 2/2008 | Cadambi et al. .............. 726/22 |
| 2010/0114811 A1 * | 5/2010 | Lambov ........................ 706/48 |
| 2010/0153420 A1 * | 6/2010 | Yang et al. .................... 707/758 |
| 2010/0153920 A1 * | 6/2010 | Bonnet ......................... 717/122 |

(Continued)

FOREIGN PATENT DOCUMENTS

EP 1744235 A1 * 1/2007

OTHER PUBLICATIONS

Michela Becchi and Srihari Cadambi, Memory-Efficient Regular Expression Search Using State Merging, IEEE INFOCOM 2007, publsihed 2007, pp. 1064-1072.*

(Continued)

Primary Examiner — Jeffrey A Burke
(74) Attorney, Agent, or Firm — John C. Pokotylo; Straub & Pokotylo

(57) ABSTRACT

Previously configured state machines may accept an input string, and for each of the regular expression(s), check for a match between the input string accepted and the given regular expression using the configured nodes of the state machine corresponding to the given regular expression. Checking for a match between the input string accepted and the given regular expression using configured nodes of a state machine corresponding to the given regular expression by using the configured nodes of the state machine may include (1) checking detection events from a simple string detector, (2) submitting queries to identified modules of a variable string detector, and (3) receiving detection events from the identified modules of the variable string detector.

16 Claims, 21 Drawing Sheets

(56) References Cited

U.S. PATENT DOCUMENTS

2010/0199348 A1* 8/2010 Sahni et al. .................. 726/23
2011/0093484 A1 4/2011 Bando et al.

OTHER PUBLICATIONS

Domenico Ficara et al., An Improved DFA for Fast Regular Expression Matching, ACM SIGCOMM, vol. 38, num. 5, publsihed Oct. 2008, pp. 29-40.*

Bando et al., LafA: Lookahead Finite Automata for Scalable Regular Expression Detection, ANCS 2009, publsihed Oct. 2009.*

Jai-Joon Yang et al., New State Assignment Algorithms for Finite State Machines Using Lookahead, IEEE Custom INtegrated Sircuits Conference 1991, published 1991.*

Haoyu Song and John Lockwood, Efficient Packet Classification for Network Intrusion Detection using FPGA, International Symposium on Field-Programmable Gate Arrays (FPGA'05), published Feb. 2005.*

* cited by examiner

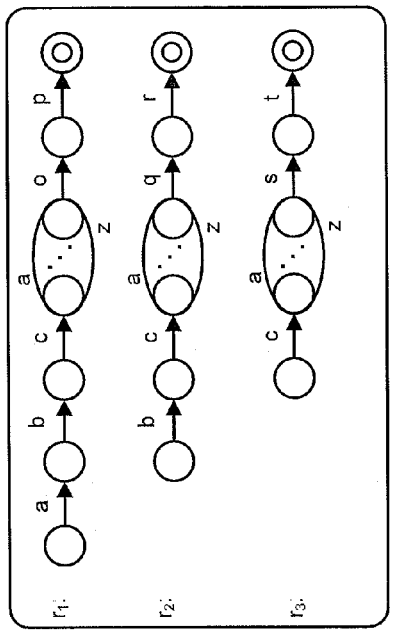
FIGURE 2A
REGULAR EXPRESSIONS
R = {r_1, r_2, r_3}
r_1: abc[a-z]op
r_2: bc[a-z]qr
r_3: c[a-z]st
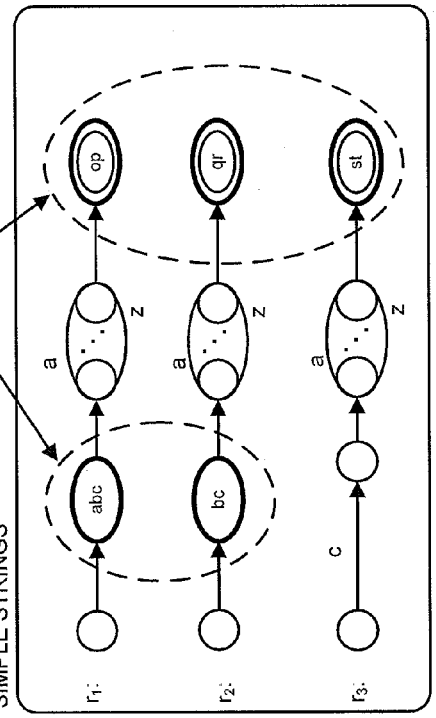
FIGURE 2B — NFA REPRESENTATION OF R
FIGURE 2C — SEPARATION OF SIMPLE STRINGS

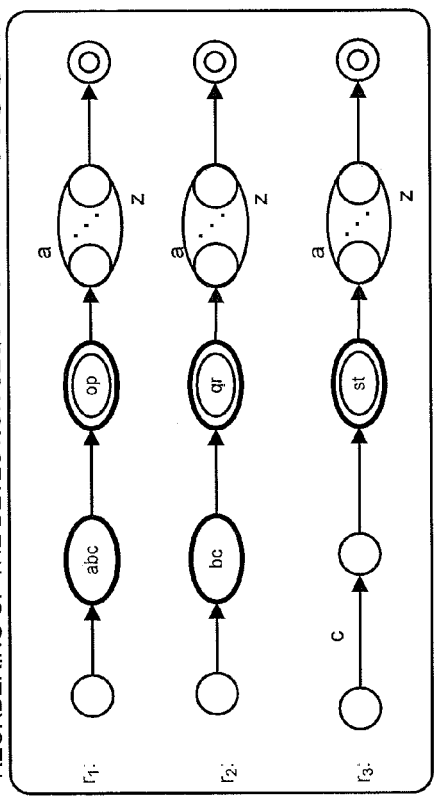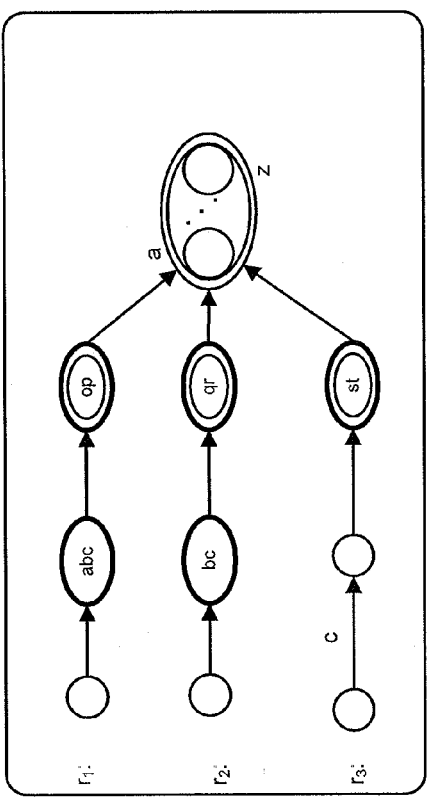

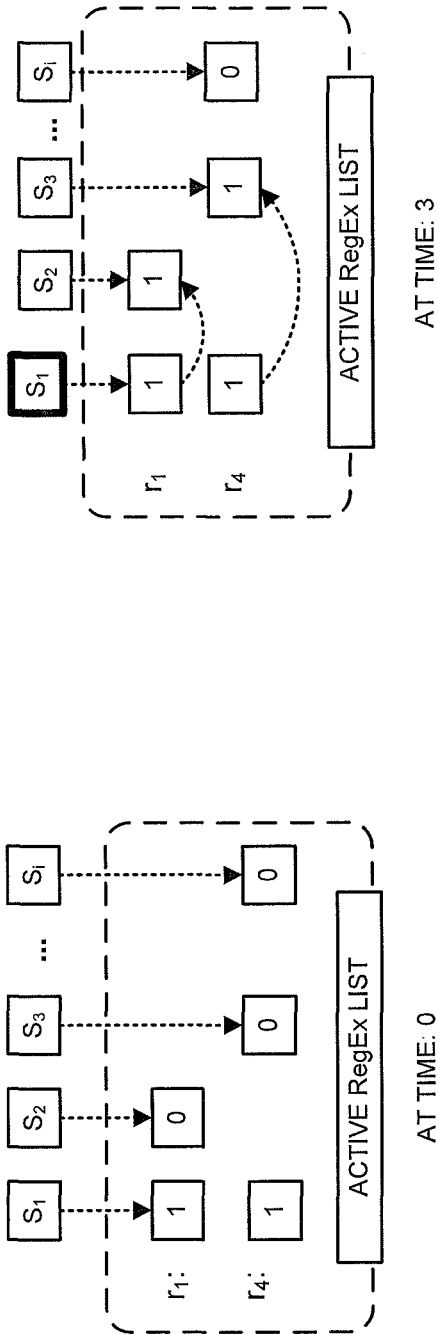

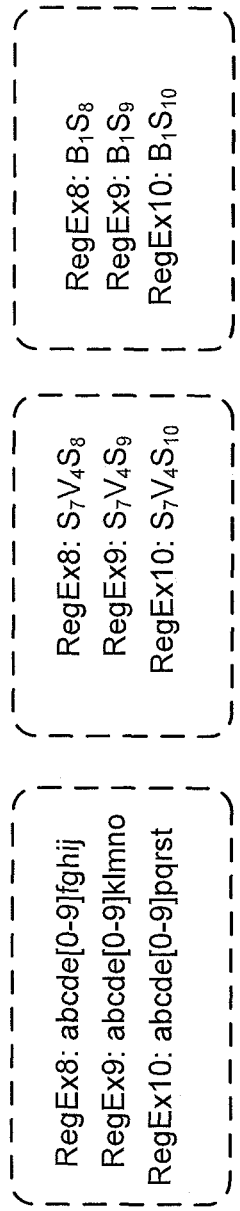

RegEx10: abcde[0-9]pqrst
RegEx11: abcde[a-f][[^\n]{300}

RegEx10: $S_7V_4S_{10}$
RegEx11: $S_7V_5V_6$

RegEx10: $S_7V_4S_{10}$
RegEx11: $S_7V_5V_6T_0$

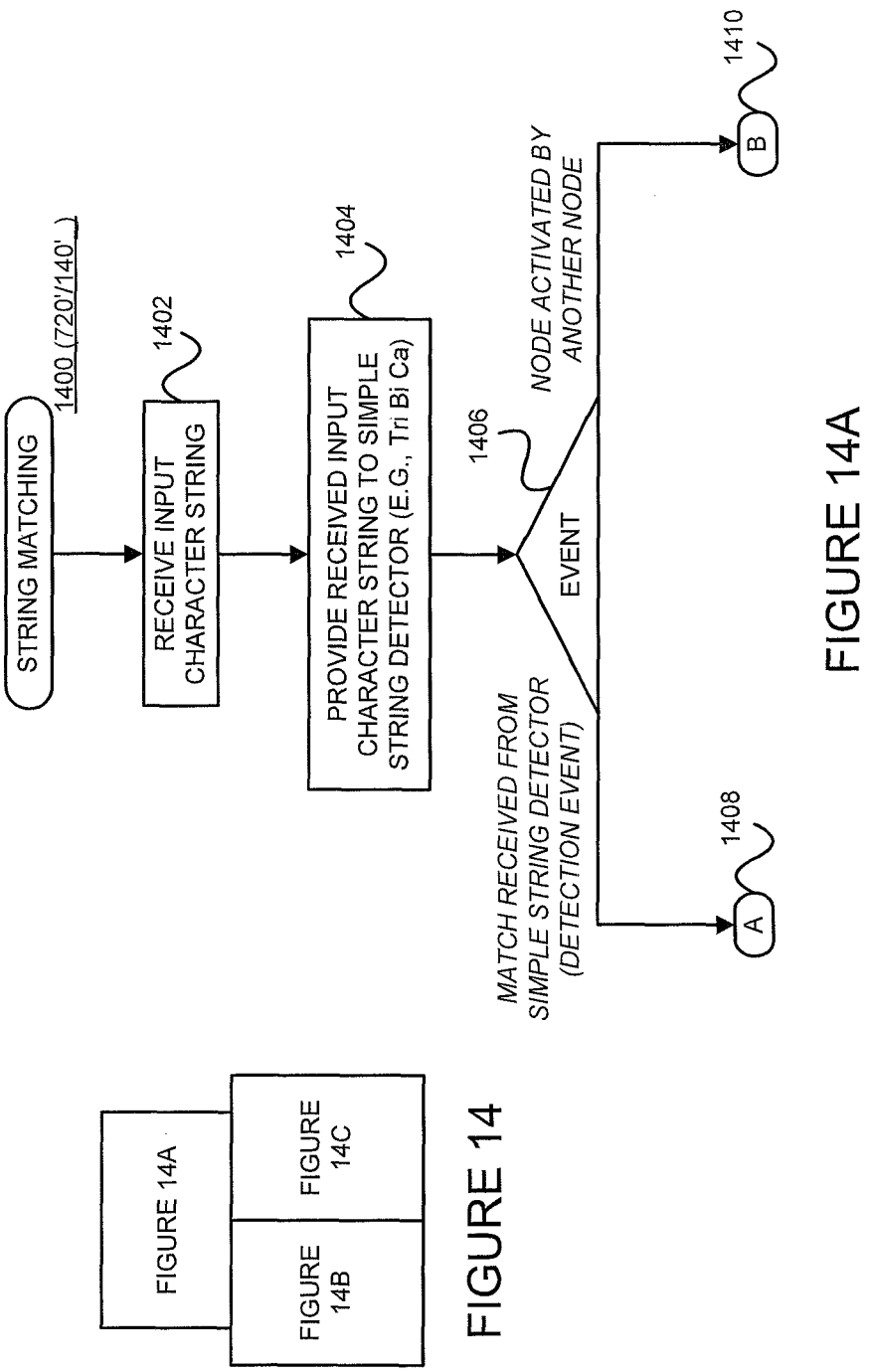

DETERMINING WHETHER AN INPUT STRING MATCHES AT LEAST ONE REGULAR EXPRESSION USING LOOKAHEAD FINITE AUTOMATA BASED REGULAR EXPRESSION DETECTION

0. PRIORITY CLAIM

This application claims the benefit of U.S. Provisional Patent Application Ser. No. 61/252,651 (incorporated herein by reference and referred to as "the '651 provisional"), titled "LaFA: LOOKAHEAD FINITE AUTOMATA REGULAR EXPRESSION DETECTION SYSTEM," filed on Oct. 17, 2009, and listing Masanori Bando, (Nabi) Sertac Artan and Hung-Hsiang Jonathan Chao as inventors. The present invention in not limited to requirements of the particular embodiments described in the '651 provisional.

1. BACKGROUND OF THE INVENTION

1.1 Field of the Invention

The present invention concerns matching an arbitrary length string with one of a number of known regular expressions, and/or configuring state machines for this purpose. Such matching may be used for network intrusion detection and prevention.

1.2 Background Information

Although Regular Expressions (referred to as "RegExes") have been widely used in network security applications, their inherent complexity often limits the total number of RegExes that can be detected using a single chip for a reasonable throughput. This limit on the number of RegExes impairs the scalability of today's RegEx detection systems. The scalability of existing schemes is generally limited by traditional per character state processing and state transition detection paradigm.

RegExes are used to flexibly represent complex string patterns in many applications ranging from Network Intrusion Detection and Prevention Systems ("NIDPS") (See, e.g., "Bro Intrusion Detection System," http://www.bro-ids.org, and "Snort Network Intrusion Detection System," http://www.snort.org, both incorporated herein by reference.) to compilers (See, e.g., A. V. Aho, M. S. Lam, R. Sethi, and J. D. Ullman, *Compilers: Principles, Techniques, and Tools* (2nd Edition) (Addison Wesley, 2006), incorporated herein by reference.) and DNA multiple sequence alignment (See, e.g., the articles, A. N. Arslan, "Multiple Sequence Alignment Containing a Sequence of Regular Expressions," *CIBCB*, pp. 1-7 (2005), and Y. S. Chung, W. H. Lee, C. Y. Tang, and C. L. Lu, "RE-MuSiC: a Tool for Multiple Sequence Alignment with Regular Expression Constraints," *Nucleic Acids Res.* (Web Server issue), no. 35, pp. W639-644, 2007, both incorporated herein by reference.). For instance, RegExes are used for representing programming language tokens in compilers or constraint formulation for DNA multiple sequence alignment. In particular, NIDPSs Bro and Snort, and Linux Application Level Packet Classifier (L7 filter) (See, e.g., J. Levandoski, E. Sommer, and M. Strait, "Application Layer Packet Classifier for Linux," http://17-filter.sourceforge.net, incorporated herein by reference.) use RegExes to represent attack signatures or packet classifiers.

A NIDPS RegEx detection system for high speed networks should satisfy the following two requirements—(1) scalability and (2) high throughput. A scalable detection system can accommodate more policies (rules) that increase the flexibility of the NIDPS. NIDPS should also support ever increasing traffic demand. The number of RegExes in the Snort signature set increased from 1131 RegExes in 2006, to 2290 RegExes in 2009, and the typical RegEx length keeps growing.

Internet carriers and vendors have successfully experimented with 100-Gbps equipment. In September 2008, Verizon successfully performed a 100-Gbps transmission for more than 646 miles. (See, e.g., "Verizon and Nokia Siemens Networks Set New Record for 100 Gbps Optical Transmission," http://newscenter.verizon.com, incorporated herein by reference.) Cisco's global IP traffic forecast report states that global IP traffic will double nearly every two (2) years by the end of 2012 and, consequently, annual global IP traffic will exceed half a zetta ($10^{21}$) bytes in 2013. (See, e.g., "Networking Solutions White Paper," http://www.cisco.com, incorporated herein by reference.) In the art, there is no current state-of-the-art regular expression detection system capable of supporting such large RegEx sets (i.e., RegEx sets of 1000 RegExes or more, such as Snort which includes at least 2290 RegExes at this time), and even larger RegEx sets expected in the future, with high speed (e.g., 40 Gbps to 100 Gbps, or higher) demand. Thus, there is a need to support current and expected future RegEx sets with small memory requirements. Detection at line-speed is another desirable attribute of NIDPS. It would be desirable to be able to use very high speed on-chip memory, even for large RegEx sets, thereby supporting a higher throughput required for today's and tomorrow's line speeds.

Finite Automata ("FA") are the de-facto tools to address the RegEx detection problem. For RegEx detection on an input, the FA starts at an initial state. Then, for each character in the input, the FA transitions to the new state determined by the previous state and the current input character. If the resulting state is unique, the FA is called a Deterministic Finite Automaton ("DFA"); otherwise, it is called a Non-Deterministic Finite Automaton ("NFA"). (See, e.g., N. Wirth, *Compiler Construction* (Addison Wesley, 1996), incorporated herein by reference.)

NFA and DFA represent two extreme cases of the tradeoff between performance and resource usage. DFA has constant time complexity since it guarantees only one state transition per character by definition. The constant time complexity per character allows DFA to achieve high-speed RegEx detection, which makes DFA the approach preferred currently. This is especially the case for software solutions, since DFA can be executed fast, serially on commodity CPUs. NFA, on the other hand, typically requires massive parallelism, making it harder to implement in software. NFA also allows multiple simultaneous state transitions, which leads to a higher time complexity. However, the price paid for the high speed of DFA is its prohibitively large memory requirement.

Recent applications, most notably deep packet inspection for NIDPS, require RegEx detection scalable to high quantities of complex RegExes. This need for scalability makes the DFA impractical for such applications, due to its large memory requirement. Since NFA is not fast, RegEx detection at high speeds, scalable to large sets of complex RegExes, is still an open issue. Thus, a better NIDPS is needed.

The present inventors note that three characteristics common to most of today's state-of-the-art RegEx detection systems limit the scalability of these systems. First, RegExes consist of a variety of different "components," such as character classes or repetitions. (See, e.g., "Perl Compatible Regular Expressions," http://www.pcre.org/, incorporated herein by reference.) This variety makes it hard to identify a method for concurrently detecting all of these different components of a RegEx efficiently. However, in most cases today, these heterogeneous components are detected by a state machine that consists of homogeneous states. This leads to inefficiencies that limit the scalability of such systems. Second, the order of components in a RegEx is preserved in the state machine detecting this RegEx. However, it may be beneficial to change the order of the detection of components in a RegEx. For instance, it is easy to detect exact strings (simple strings) as they are expected to appear less frequently, whereas others may appear more frequently (for instance, character classes). (The present inventors found that by reordering the detection of the components, the trade-off between detection complexity and appearance frequency can be exploited for better scalability.) Finally, most RegExes share similar components. In the traditional FA approaches, a state machine is used to detect a component in a RegEx. This state machine is duplicated since the similar component may appear multiple times in different RegExes. Furthermore, most of the time, these RegExes sharing this component cannot appear at the same time in the input. As a result, the duplication of the same state machine for different RegExes introduces redundancies, which limit the scalability of the RegEx detection system.

Based on the foregoing three observations of the inventors, a LaFA scheme is introduced—a novel and inventive detection method that resolves scalability issue of current RegEx detection paradigm. The scalable compact Look-ahead Finite Automata ("LaFA") data structure requires small memory footprint and makes it feasible to implement large RegEx sets using only very fast, small on-chip memory.

2. SUMMARY OF THE INVENTION

The main focus of existing RegEx detection schemes is optimizing the number of states and the required transitions, but not the suboptimal character-based detection method. Furthermore, the potential benefits of reduced number of operations and states using out-of-sequence detection methods have not been explored.

In at least some embodiments consistent with the present invention, state machines used to order and select matching operations for determining whether an input string matches any of at least one regular expression are configured by (1) accepting the set of regular expression(s), and (2) for each of the regular expression(s) of the set accepted, (A) identifying any look-ahead type strings within the given regular expression, (B) identifying any sequential type strings within the given regular expression, (C) partitioning the regular expression based on any identified simple strings, any identified look-ahead type variable strings, and any sequential type variable strings to generate partitioned parts of the given regular expression, (D) reordering the partitioned parts of the given regular expression using optimization policies to generate reordered partitioned parts of the regular expression, and (E) configuring nodes of a state machine corresponding to the given regular expression, by recording configured information of the nodes on a tangible storage medium, using (i) an order of the reordered partitioned parts of the regular expression, and (ii) a string type of the partitioned parts of the regular expression. Once configured, the state machines may accept an input string, and for each of the regular expression(s), check for a match between the input string accepted and the given regular expression using the configured nodes of the state machine corresponding to the given regular expression. Checking for a match between the input string accepted and the given regular expression using configured nodes of a state machine corresponding to the given regular expression by using the configured nodes of the state machine may include (1) checking detection events from a simple string detector, (2) submitting queries to identified modules of a variable string detector, and (3) receiving detection events from the identified modules of the variable string detector.

Given previously configured state machines, embodiments consistent with the present invention can determine whether an input string matches at least one regular expression by: (1) accepting the input string; and (2) for each of the at least one regular expression, checking for a match between the input string accepted and the given regular expression using configured nodes of a state machine corresponding to the given regular expression by using the configured nodes of the state machine to (i) check detection events from a simple string detector, (ii) submit queries to identified modules of a variable string detector, and (iii) receive detection events from the identified modules of the variable string detector.

Embodiments consistent with the present invention use LaFA to perform scalable RegEx detection using a very small amount of memory. LaFA's memory requirement can be made very small due to the following features. First, different parts of a RegEx (namely RegEx "components") are detected using different detectors, each of which may be specialized and optimized for the detection of a certain RegEx component. Second, the RegEx component detection sequence is systematically reordered. This provides new opportunities for memory optimization. Third, many redundant states in classical finite automata are identified and eliminated. Simulations have shown that embodiments consistent with the present invention require an order of magnitude less memory compared to today's state-of-the-art RegEx detection systems. A single commodity Field Programmable Gate Array ("FPGA") chip can accommodate up to twenty-five thousand (25 k) RegExes. Based on the throughput of an exemplary LaFA embodied on an FPGA, it is estimated that a 34-Gbps throughput can be achieved.

3. BRIEF DESCRIPTION OF THE DRAWINGS

FIGS. 2A-2F illustrate a set of regular expressions being transformed according to a LaFA representation consistent with the present invention.

FIG. 3A is a matrix depicting the depth and the detection complexity of example components, while

FIGS. 8A-8D illustrate how multiple RegEx(es) are organized in a correlation block, along with node activation and timing verification operations, in an exemplary embodiment consistent with the present invention.

FIGS. 12A-12C illustrate block detection optimization within an exemplary LaFA architecture consistent with the present invention.

Figure 14B:
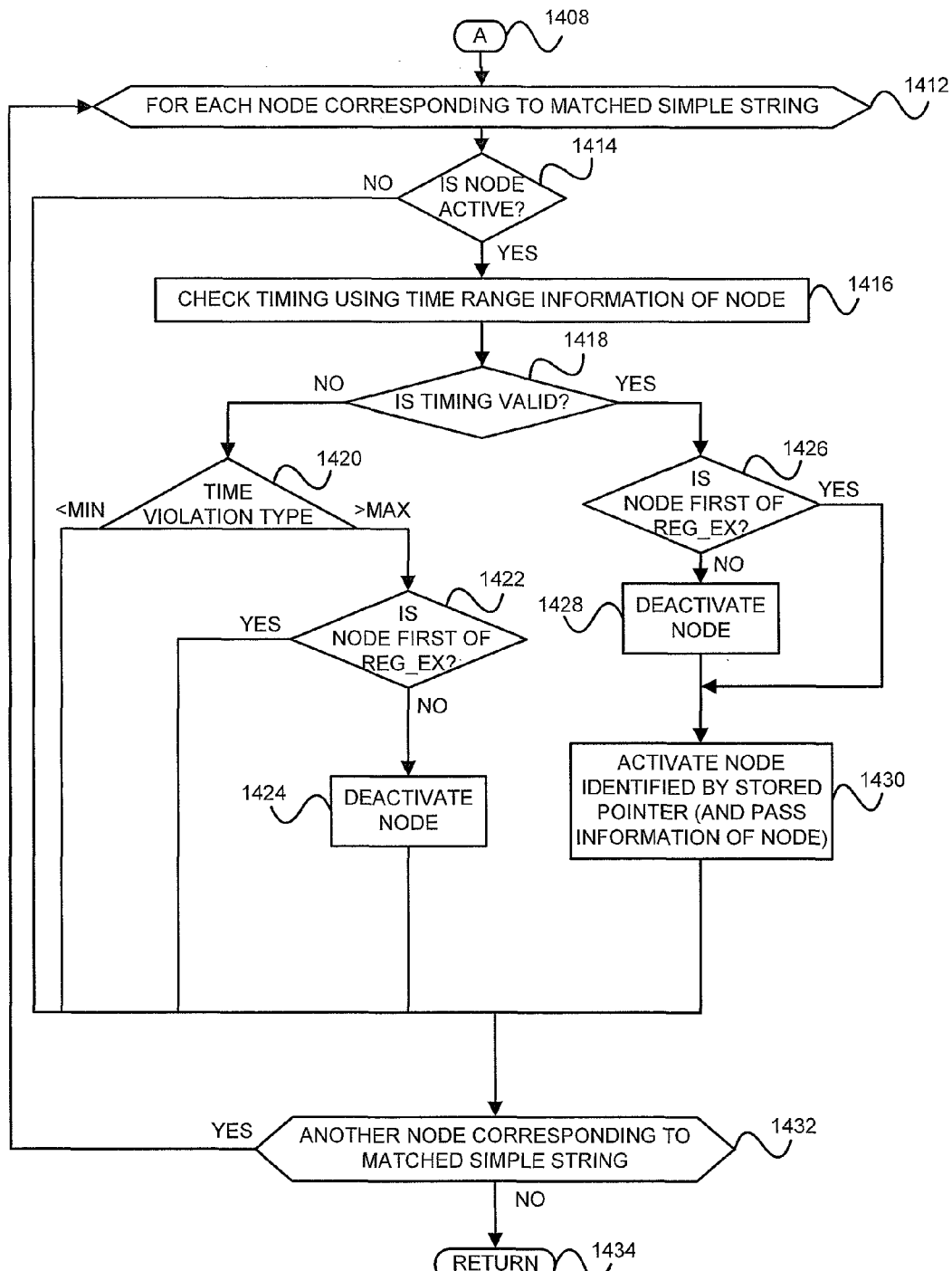
Figure 14C:
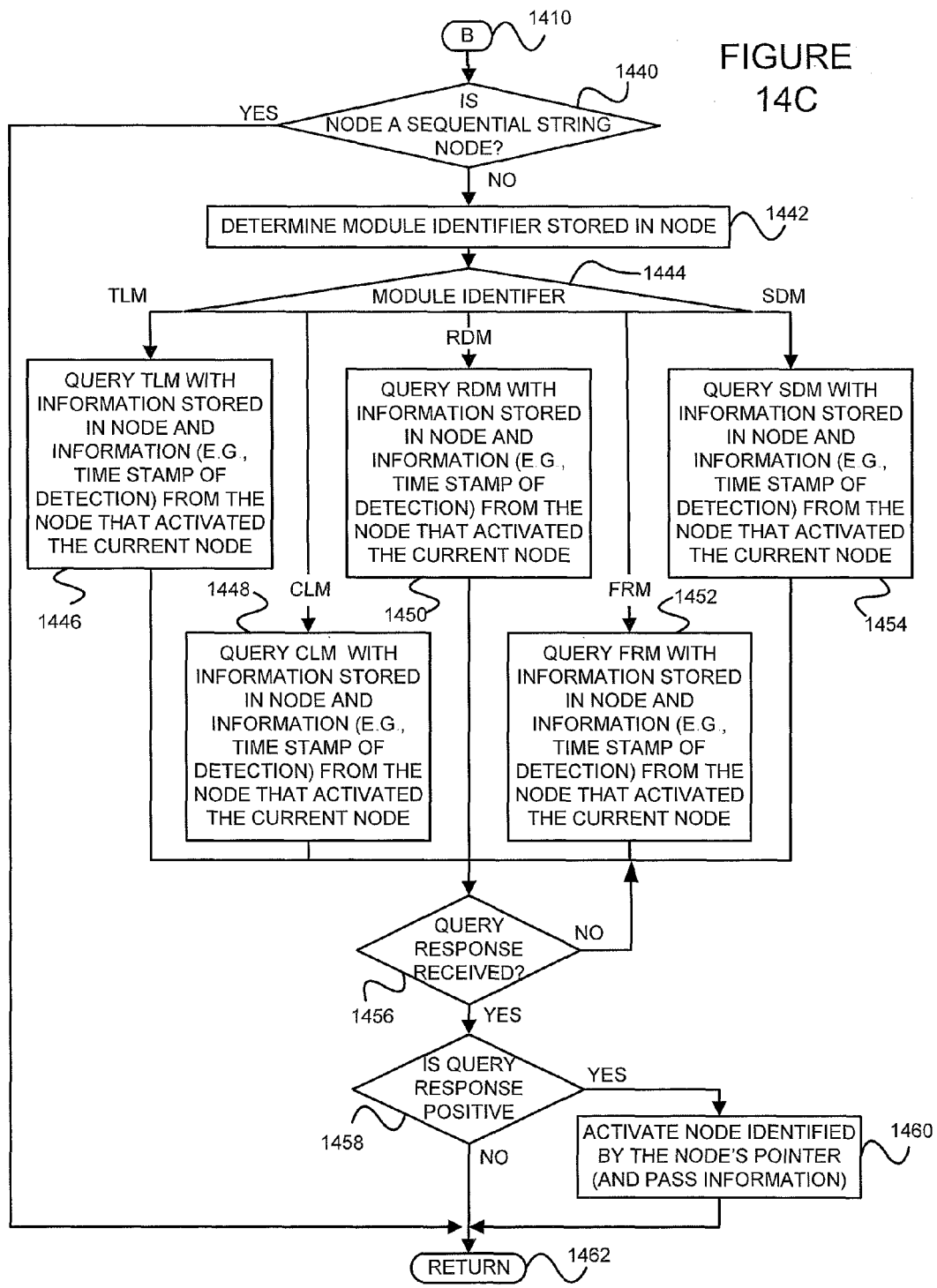

FIG. 14, which includes FIGS. 14A-14C, illustrates a flow diagram of an exemplary string matching method, consistent with the present invention.

4. DETAILED DESCRIPTION

The present invention may involve novel methods, apparatus, message formats, and/or data structures for determining whether or not an arbitrary-length bit string matches one or more of a number of known regular expressions, as well as generating a data structure (e.g., a LaFA state machine) used in such a determination. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventors regard their invention as any patentable subject matter described.

Figure 1:
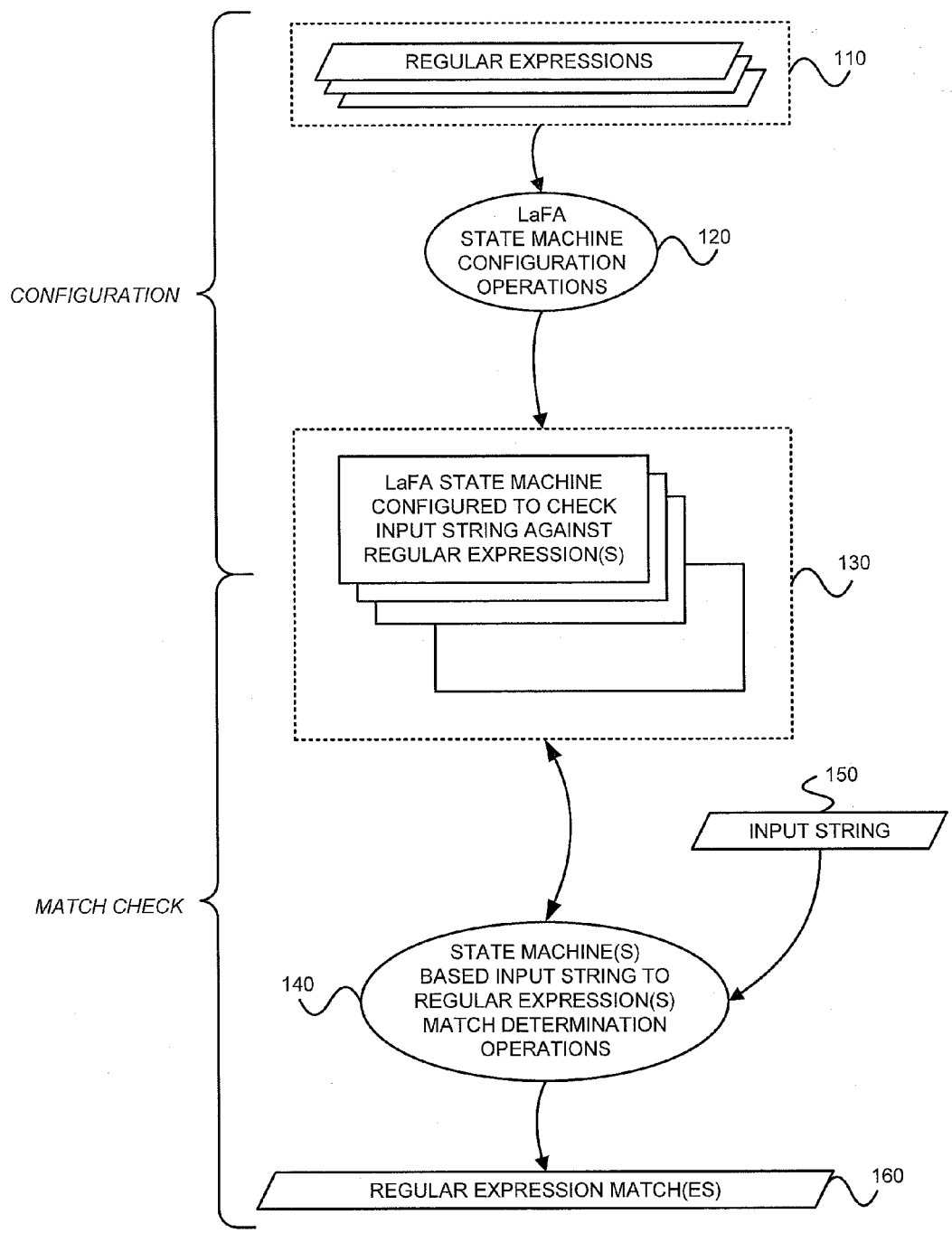
FIG. 1 is a bubble diagram illustrating general operations of configuring and querying a LaFA state machine for determining a possible match between an arbitrary-length input string to a set of one or more regular expression(s), in a manner consistent with the present invention.

4.1 Overview—Configuration of State Machines Using Regular Expressions and Matching an Input String to a Regular Expression Using a Configured State Machine FIG. 1 is a bubble diagram illustrating general operations of configuring and querying a LaFA state machine for determining a possible match between an arbitrary-length input string and a regular expression(s) belonging to a set of one or more regular expression(s). Specifically, the proposed LaFA state machine configuration operations 120 are performed first using a set of one or more regular expressions 110. Once the operations 120 are completed, a highly optimized and scalable LaFA state machine data structure 130 results. The LaFA state machine data structure 130 is configured such that an arbitrary-length input string may be checked against the set of one or more regular expressions 110. More specifically, given an input string(s) 150, the configured LaFA state machine data structure 130 may be used by input string(s) to regular expression(s) match determination operations 140. If a match is determined by such operations 140, then the LaFA system may return a list of matching RegEx(es) 160.

The proposed LaFA system is a finite automata state machine optimized for scalable RegEx detection. The LaFA system is used for representing a set of n RegExes, $R=\{r_1, r_2, \ldots r_n\}$, which can also be called a RegEx Database. For instance, this set of RegExes can be a set of Snort signatures, or Bro or Linux Layer 7 rules. An associated LaFA RegEx detection system can be queried with an input I, such as a network packet. The system may return a match along with a list of matching RegExes if input I matches one or more of the RegExes in R. Otherwise, a "no match" result is returned.

The following illustrates advantageous features and provides an initial examination of the proposed LaFA system with the help of a simple example.

Figure 2F:
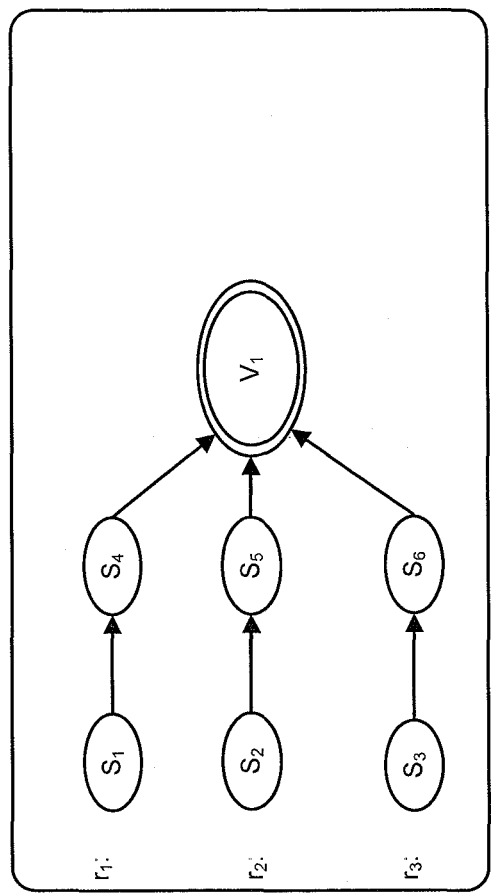

Consider, the RegEx set, R including three RegEx(es), $r_1$, $r_2$, and $r_3$ as shown in FIG. 2A. The traditional NFA representation of R is shown in FIG. 2A. The first step in constructing the LaFA data structure is the detection and separation of simple strings from variable strings within a RegEx for each of the RegEx(es) in the set R. A simple string is a fixed sequence of characters such as "abc" and "op" in $r_1$. In practice, it can be a word in the dictionary or an excerpt from an executable file. Consider the state diagram of the traditional NFA in FIG. 2B. A separate state is defined for each character in simple strings. Although a per-character state transition looks simple, it may require many state transitions per character when multiple RegEx(es) are to be matched against the RegEx database. Consider the input characters "abc". The "a" state of $r_1$ is first matched followed by the "b" states of both $r_1$ and $r_2$. Then, as the input character "c" arrives, the "c" states of all FAs are matched. All three FAs concurrently transition to their [a-z] states (i.e., variable string component [a-z]). Hence, one can appreciate the resulting large number of concurrent active states for a database of hundreds of RegEx(es). A large number of concurrent active states often necessitate high resource requirements and low throughput.

Note that the detection of simple strings (namely, the exact string matching) is a well-studied problem with many optimized solutions. In particular, there are high throughput hardware solutions with very small memory footprints. Exemplary embodiments consistent with the present invention exploit the fact that neither NFA, nor DFA, is the most efficient method to detect these simple strings. Rather, such embodiments merge the states of each simple string portion of the automata (i.e., "abc", "bc", "op", "qr", and "st") into a single super state. These simple strings can then be detected using high-speed exact string matching methods. The resulting FA, as shown in FIG. 2C, has fewer states than the traditional NFA in FIG. 2B. By generating one detection event per simple string, rather than making many state transitions for each input character as in an NFA or DFA, the LaFA system significantly reduces the number of operations.

By definition, NFA and DFA are constructed based on the order of components in the RegEx. Thus, the appeared order of components in the RegEx is preserved as the order of state in the FA. As a result, the reordering of the sequence of detection is difficult. In FIG. 2C, each FA consists of three components: (1) a simple string, (2) a character class [a-z] (i.e., variable string [a-z]), and (3) another simple string. Consider matching the example input string "abcxop" against the states in FIG. 2C. For this particular input, after matching earlier states for "abc", "bc", and "c", all three FAs go to their respective super states of [a-z] for matching "x", concurrently. As the input continues to "op", however, the input matches only to the first RegEx $r_1$. Note that, in fact, there is no possible input that can match to more than one RegEx for this example set of RegEx(es). Observe that the FAs for $r_2$ and $r_3$ made the unnecessary [a-z] detection just to abandon the search at the end when neither of the simple strings "qr" or "st" is found in the input.

In the exemplary LaFA system, the reordering of the detection sequence as shown in FIG. 2D is proposed. For instance, as depicted in FIG. 2D, the third component in each RegEx, the simple string, is swapped with the second component, the variable string (character class) [a-z]. As a result, considering the RegEx $r_1$ for instance, the [a-z] detection is only performed only if both "abc" and "op" are detected in order (not necessarily consecutively). Consequently, referring to FIG. 2E, for the example input of "abcxop", exactly one [a-z] detection is performed rather than three concurrent [a-z] detections as in the case before reordering in FIG. 2C. In general, components in RegExes may be classified based on the information revealed about a RegEx, if a certain component in that RegEx is found. Considering $r_1$ as an example again, ($r_1$: abc[a-z]op), detecting the simple string "abc" in the input reveals more information than detecting the variable string [a-z]; namely a range of characters from a to z. Intuitively, one expects that more restrictive matching components (like "abc") should occur much less frequently in inputs than less restrictive components (like [a-z]). In the present embodiment, components that reveal more information (such as "abc") are called "deep" components, while components that do not reveal much information (such as [a-z]) are called "shallow" components.

Furthermore, there are deep components that are more complex to detect than simple strings. For example, a string repetition element "\n{x, y}" is deep but requires more complex operations than an exact string matching. It would be advantageous to detect simple components (requiring lower detection complexity) before the more complex components (requiring higher detection complexity). In this way, the probability of requiring evaluation of the latter components is reduced. Therefore, components may be further classified according to how complex it is to detect that component.

Figure 3A:
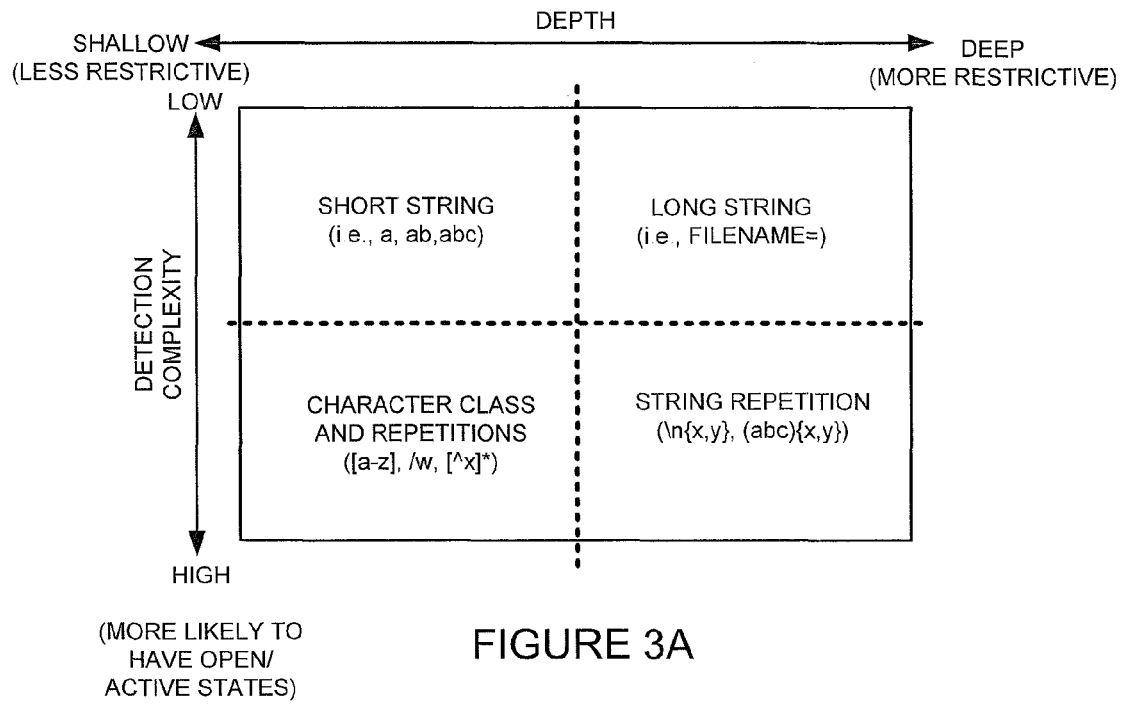

FIG. 3A shows a matrix of the depth (or restrictiveness) and the detection complexity of components with examples. At least some exemplary LaFA schemes consistent with the present invention detect simple and deep components before complex and/or shallow ones. This aspect of the LaFA scheme is referred to as "Look-ahead" in the following.

A typical detection operation involving NFA or DFA requires at least one state transition for each input character. As a result, the handling of state transitions saves a prominent portion of the operation costs by using the exemplary LaFA super states. The number of state transitions can be reduced, on average, to less than one per input character using an exemplary LaFA scheme consistent with the present invention. This is basically a highly optimized regular expression detection system. Every time a component such as a simple string is detected, a detection event is generated. These events are then correlated to determine if they correspond to one or more RegExes in the RegEx set. The details of this aspect of the exemplary LaFA are covered in later.

As can be appreciated from the foregoing, detection of some components (e.g., the [a-z] component which is a variable string) only needs to be done once at any given time. Instead of duplicating those components in multiple RegEx(es), resources and memory can be saved by sharing those rarely used components. The resulting LaFA representation is shown in FIG. 2E. Furthermore, exemplary special modules are used that are specifically designed to efficiently detect certain types of variable strings to replace these states. Details of such exemplary modules are described below.

Each unique component in a RegEx is assigned an identification code called a string ID. The ID includes two parts. The one part (e.g., the first part) identifies the component type either as S (simple string) or V (variable string). The notation is presented in FIG. 2F for the example discussed above. Simple string components such as "abc", and "st" are each assigned unique string IDs from $S_1$ to $S_6$ in FIG. 2F. Variable string component "[a-z]" is assigned $V_1$ as a string ID.

Figure 3B:
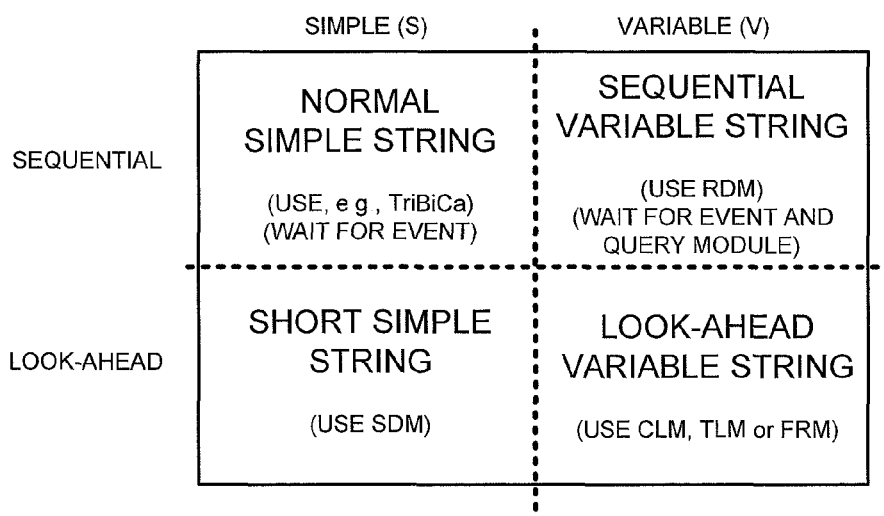
FIG. 3B is a matrix illustrating a string classification scheme that may be used by embodiments consistent with the present invention.

The foregoing example, referring to FIGS. 2A-2E, illustrates that embodiments consistent with the present invention can be used to produce a highly optimized regular expression detection system. In general, the exemplary LaFA scheme achieves such a highly optimized system by (1) identifying simple strings and variable strings from a set of given RegEx(es), and subsequently (2) reordering such components according to a set of optimization policies which will be discussed below. Based on the resulted reordering of components, a state machine is configured accordingly allowing for a highly optimized regular expression detection system to be produced. There exist many types of variable strings—some may be reordered (i.e., allowing the "Look-ahead" operations), while others may not (i.e., requiring sequential operations). As such, look-ahead-type variable strings will be denoted as $V_{la}$ and variable strings that may not be reordered are denoted as $V_{seq}$. Even simple strings may be further classified as "normal" simple strings or "short" simple strings. FIG. 3B is a matrix illustrating a possible classification of strings normal simple strings, short simple strings, sequential variable strings and look-ahead variable strings Note that each of the variable strings $V_{la}$ and $V_{seq}$ may be further classified into sub-types of variable strings. The variable string $V_1$ mentioned in the above-discussed example is a look-ahead type variable string $V_{la}$. A table listing sub-types of variable strings will be described below.

Figure 4:
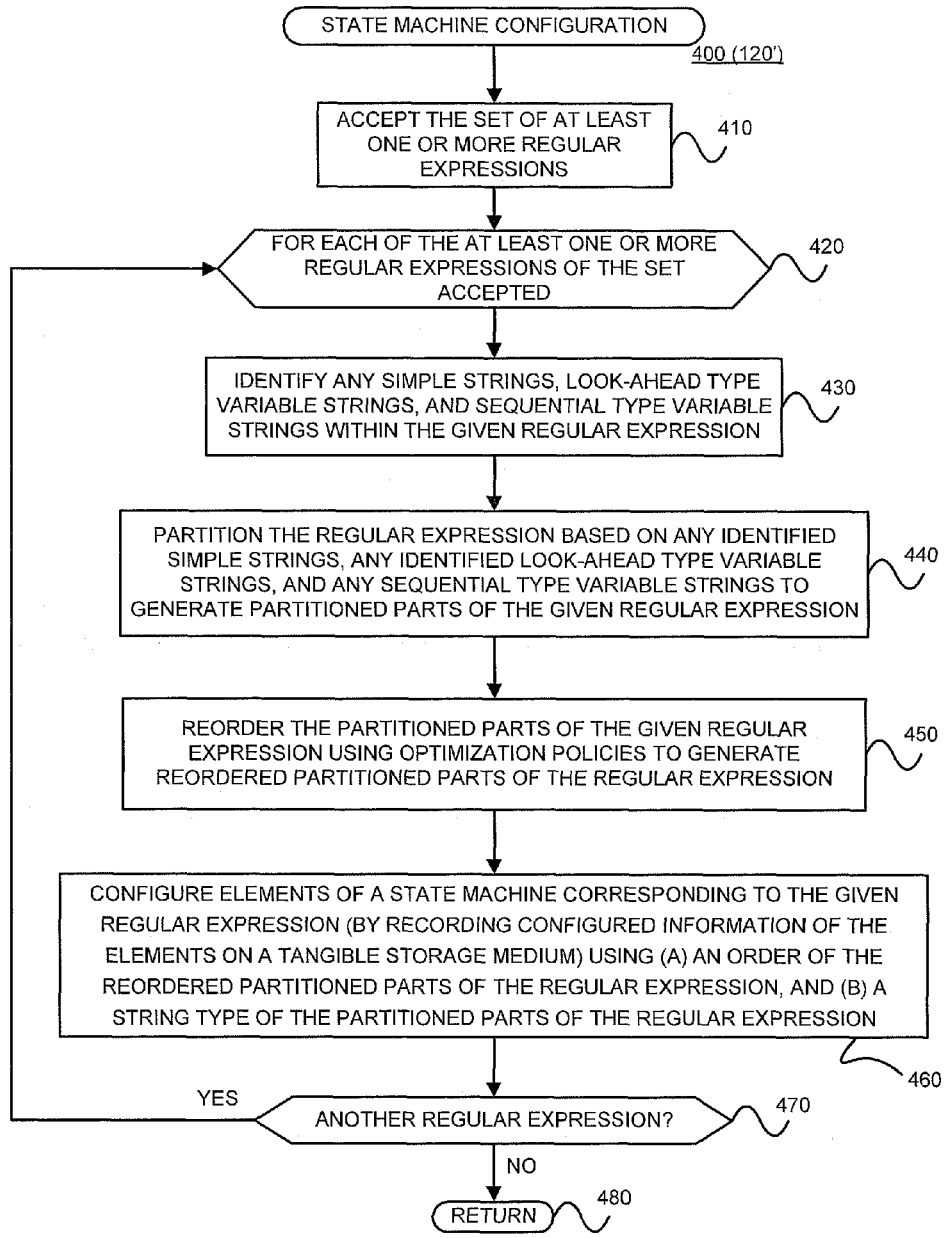
FIG. 4 is a flow diagram of an exemplary method for configuring a LaFA state machine to check an arbitrary input sting against a set of at least one or more regular expression(s), in a manner consistent with the present invention.

FIG. 4 is a flow diagram of an exemplary method 400 for configuring a LaFA state machine (which may then be used to check an arbitrary input sting against a set of at least one or more regular expression(s)) in a manner consistent with the present invention. (Recall operations 120 of FIG. 1.) Specifically, the method 400 may accept a set of at least one or more regular expression(s). (Block 410). Thereafter, for each of the at least one or more regular expressions of the accepted set, the method 400 may identify any simple strings, look-ahead type variable strings (i.e., $V_{la}$), and sequential type variable strings (i.e., $V_{seq}$) within the given regular expression. (Blocks 420 and 430) Next, the method 400 may partition the regular expression based on any identified simple strings, any identified look-ahead type variable strings, and any sequential type variable strings to generate partitioned parts of the given regular expression. (Block 440) Then, the method 400, reorders the partitioned parts of the given regular expression using optimization policies (described in more detail below) to generate reordered partitioned parts of the regular expression. (Block 450) Subsequently, the method 400 configures elements of a LaFA state machine corresponding to the given regular expression (by recording configured information of the elements on a tangible storage medium) using (A) an order of the reordered partitioned parts of the regular expression, and (B) a component/string type of the partitioned parts of the regular expression. (Block 460) Finally, if there is another regular expression available from the accepted set, the method 400 repeats the actions performed by Blocks 430-460 within loop 420-470. Otherwise the method 400 simply terminates. (Blocks 470 and 480)

A configured state machine data structure generated by the exemplary method 400 of FIG. 4 may be used to determine quickly whether an arbitrary-length bit string matches (or might match) one of a large number of known RegEx(s) of a set. This characteristic makes such a data structure useful, for example, in communications network security. Specifically, this characteristic makes such a data structure useful to determine whether an input arbitrary-length bit string matches one of a number of known network intrusion signatures quickly. As another example, this characteristic also makes such a data structure useful to determine whether an input arbitrary-length bit string matches one of a number of known nucleotide sequences, such as known DNA and/or RNA sequences.

In the aforementioned, the core ideas behind LaFA (Look-ahead Finite Automata) that facilitate the reduction of memory requirements and detection complexity using simple examples have been illustrated. To reiterate, first the set of RegExes were first represented in NFA format. Then, the states of simple strings were identified and merged into super states. The components were reordered according to their depth and complexity. Finally, the states of components that can potentially be shared among RegExe(s) were merged. In the next section, details of the LaFA data structure and the associated scalable RegEx detection architecture are described.

Figure 5:
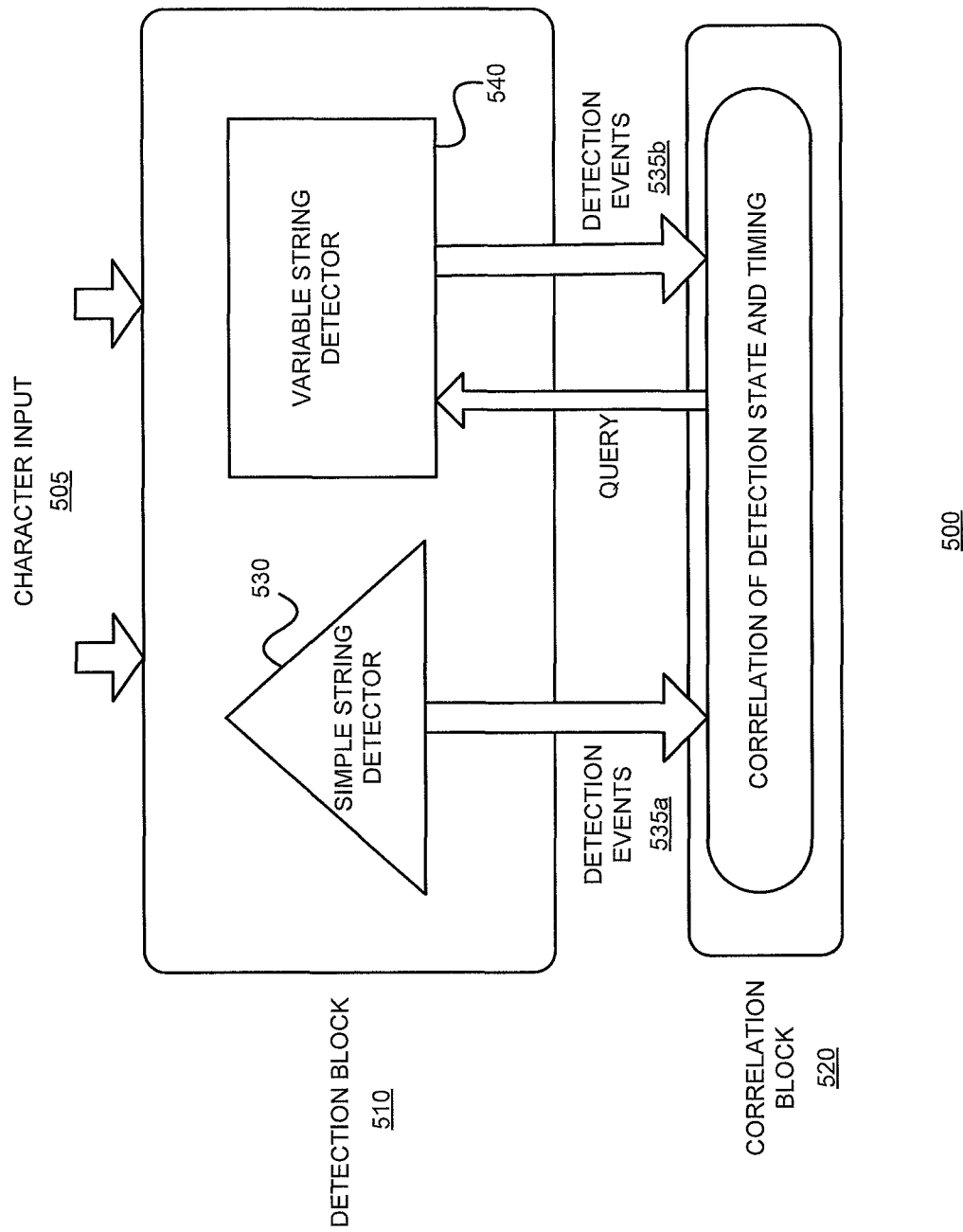
FIG. 5 is a block diagram of an exemplary LaFA architecture, including a detection block and the correlation block, consistent with the present invention.

4.2 Architecture and Configuration of State Machines for Checking an Input String Against Regular Expressions FIG. 5 is a simple block diagram of the LaFA architecture. The LaFA architecture includes a detection block 510 and a correlation block 520. The detection block 510 is responsible for detecting the components in the input string. The simple-sting detector 530 is an (e.g., highly optimized) exact string matching system used to detect simple strings. The variable-string detector 540 includes (e.g., highly optimized) variable string detection modules. The correlation block 520 is responsible for keeping track of state transitions. The correlation block 520 inspects the sequence of components in the input string (i.e., order and timing) to determine whether the input matches any of the RegEx(es) in its RegEx database.

The detectors 530 and 540 in the detection block 510 communicate their findings to the correlation block 520 by sending detection events 535a and 535b. A detector in the detection block 510 generates a detection event when it detects a component in the input 505. Each detection event includes a unique ID for the detected component, and its location in the input packet. Extra information, such as the length of the detected string, may accompany the event if desired. There can be two sources of an event. First, a "string event" is generated when a simple string is detected. Second an "in-line" event is generated by inline lookup modules. The inline event is described in detail below and specifically refers to the sequential type of variable string ($V_{seq}$) which does not allow for reordering of RegExe(s) (i.e., no "look-ahead" operations) and uses inline variable string detection modules. The generated events prompt a detection sequence in the correlation block 520 to proceed to the detection state. The details of individual blocks in the LaFA architecture and their interactions are described below. The LaFA architecture may be implemented in hardware.

The following describes the formal construction of an exemplary LaFA data structure. Given a set of RegEx(es), R, the exemplary LaFA data structure is constructed in three steps: (1) RegEx partitioning, (2) component reordering, and (3) node structure construction. Each is described below.

The first step of the exemplary LaFA data structure construction is to partition each RegEx into simple strings and variable strings. This partitioning facilitates the detection of simple strings and variable strings. In this application, each simple string is represented by the letter S and each variable string is represented by the letter V for simple representations of components. Note that the variable strings V are assumed to be the "look-ahead" type (i.e., $V_{la}$) in the following.

Figure 6:
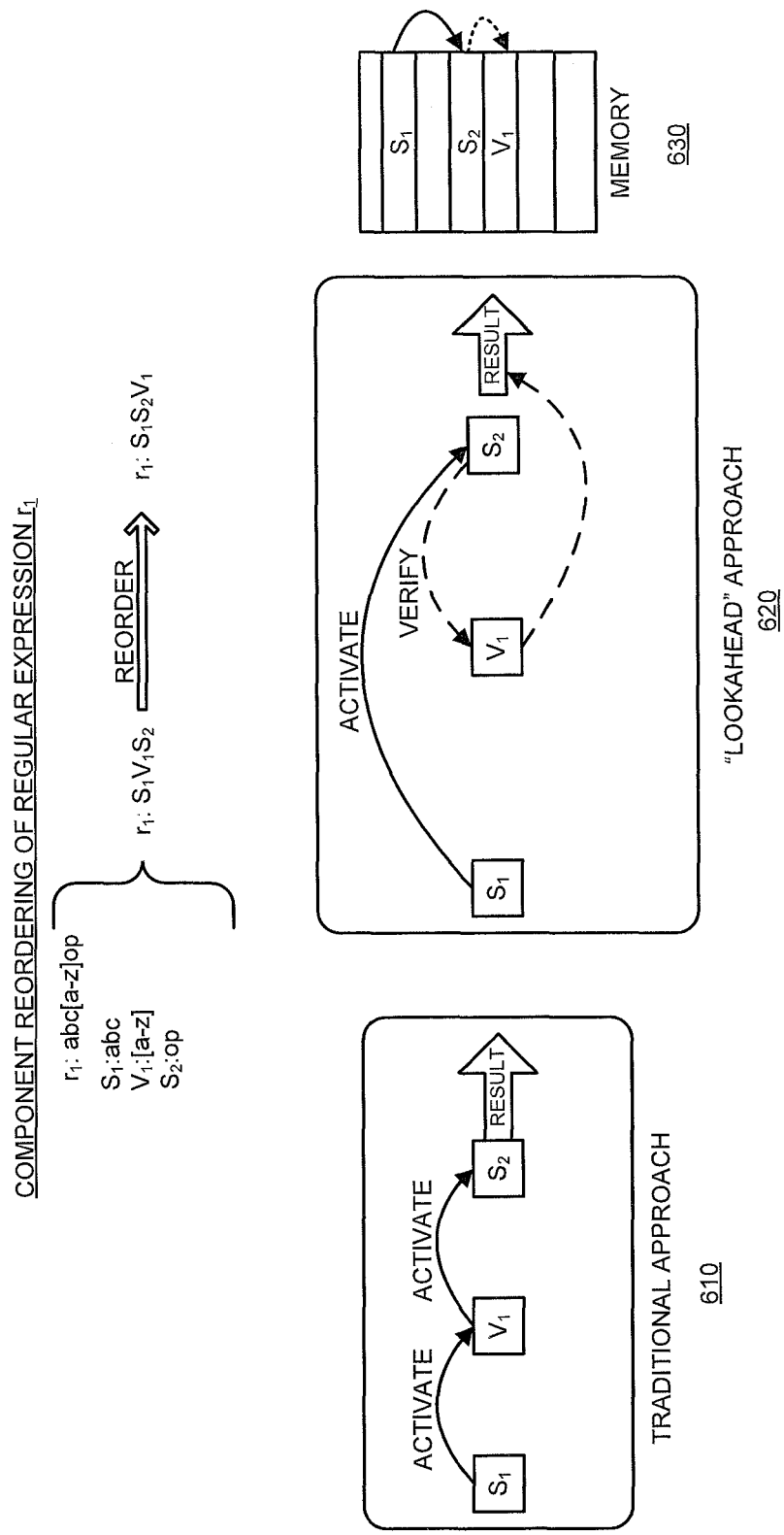
FIG. 6 illustrates the component reordering and transition states of the LaFA scheme, consistent with the present invention, as well as the storage of nodes in memory of a regular expression.

The second step of the exemplary LaFA data structure construction is the component reordering according to a set of optimization policies (described below). Component reordering was introduced in section §4.1. However, a detailed discussion of exemplary optimization policies that may be used to reorder the components will be provided in following. This section further introduces the new term "node". Nodes are depicted as squares in FIG. 6. Specifically, FIG. 6 illustrates the component reordering and transition states of an exemplary LaFA scheme, as well as the storage of nodes in memory of RegEx $r_1$:abc[a-z]op→$S_1$:abc, $V_1$:[a-z], $S_2$:op. In the traditional sequence 610 shown in FIG. 6, components are activated one by one following the sequence of the RegEx $r_1$. In contrast, the exemplary LaFA sequence (i.e., "look-ahead" approach) 620 shown in FIG. 6 skips (look-ahead) variable string $V_1$ and activates $S_2$ first. The LaFA scheme 620 verifies variable strings (e.g., $V_1$) using special variable string modules for which specific information related to individual components is also used. The location to store this component verification information (squares in the FIG. 6) is called a "node". Nodes are stored in memory 630. Verification of $S_2$ and $V_1$ will be performed successively. The nodes of $S_2$ and $V_1$ are stored at consecutive locations in the node memory 630. As long as $S_2$ and $V_1$ are allocated to consecutive memory locations, $S_1$ and $S_2$ can be stored anywhere in the memory. This helps in balancing the nodes in the node memory and the locations of simple strings are resolved by pointers. An exemplary node structure is described next.

The third step of the exemplary LaFA data structure construction is to identify the contents of a node. As in any other state machine, the LaFA state machine also has basic information in every state. As discussed, the LaFA states are associated with nodes and these nodes contain the verification information specific to each component. The node also contains the current state, which indicates whether the current state is active or inactive. Conventional FAs, such as NFA and DFA, change states constantly, with every character received. Hence, tracking sequence timing is not an issue in NFA and DFA. (That is, since NFA and DFA don't reorder strings, and since they detect strings character by character, sequence timing does not need to be tracked in NFA and DFA.) In the LaFA state machine, however, the input (event) is generated by a simple string detector. Thus, detection timing (detection sequence) may need to be verified. Given this potential need, timing information is stored in the node. A component can have variable length as well. Therefore, a node keeps two timing information pieces—namely, minimum time and maximum time. A simple string must be detected within this time range. Summarizing the information stored in a node, each node may include the following: (1) a pointer to the next state; (2) the status of the current state; (3) detection timing values (e.g., minimum time (distance) and maximum time (distance)); (4) module ID; (5) component ID; (6) minimum repetition; and (7) maximum repetition. The following sections will demonstrate why this information is stored and how it is used. More specifically, a node for processing simple string may store a time range and a pointer to a next node. A node for processing a short simple string may store a time range, a pointer to a next node, a pattern being searched for, and an SDM module identifier. A node for processing a look-ahead type variable string may store a time range, a pointer to a next node, a pattern being searched for, and a TLM module identifier. A node for processing a sequential type variable string may store a time range, a pointer to a next node, a minimum repetition, a maximum repetition, and an RDM module identifier. A node for processing a look-ahead type variable string may store a time range, a pointer to a next node, a minimum repetition, a maximum repetition, and an FRM module identifier. Finally, a node for processing a look-ahead type variable string may store a time range, a pointer to a next node, a minimum repetition, a maximum repetition, and a CLM module identifier.

Figure 7:
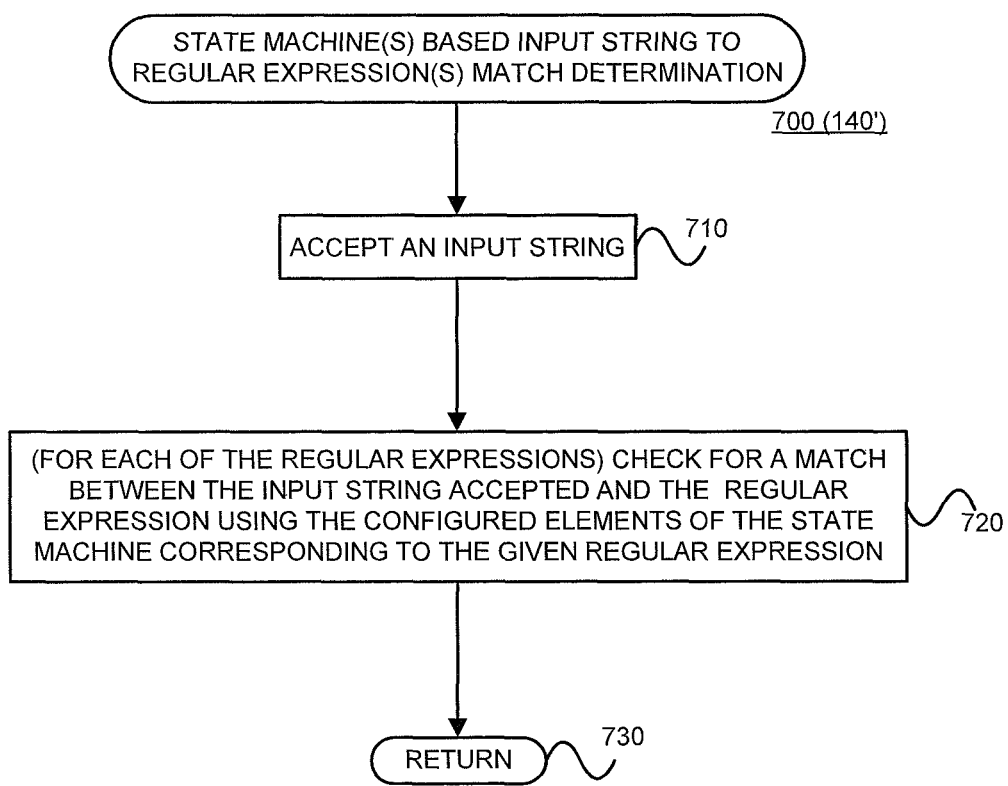
FIG. 7 is a flow diagram of an exemplary method for querying a LaFA state machine with an arbitrary input string to determine a possible match against a set of at least one or more regular expression(s), in a manner consistent with the present invention.

4.2.1 Architecture and Configuration of the Correlation Block for Checking an Input String Against Regular Expressions FIG. 7 is a flow diagram of an exemplary method 700 for querying a LaFA state machine with an arbitrary input string against a set of at least one or more regular expression(s) for determining a possible match, in a manner consistent with the present invention. (Recall, e.g., operation 140 of FIG. 1.) Specifically, the method 700 may accept an arbitrary-length input string. (Block 710) Subsequently, for each of the regular expressions, the method 700 may check for a match between the accepted arbitrary-length input string and the regular expression(s) using the configured elements of the state machine corresponding to the given regular expression(s). (Block 720) The method 730 is then left. (Node 730)

Referring back to blocks 710 and 720, FIGS. 8A-8D illustrate an example of querying a LaFA state machine according to the method 700. Practical RegEx sets include hundreds of RegEx(es) that are programmed in the correlation block. FIGS. 8A-8D illustrate how multiple RegEx(es) are organized in a correlation block, along with node activation and timing verification operations. The correlation block is organized into columns of nodes. Each node is similar to a state in a traditional FA, but includes more information than a state (e.g., next node pointer, min time, max time, component ID, etc.). A node in the LaFA system is also likely to correspond to multiple states in a traditional FA. Each column corresponds to one component, and has one node for each RegEx that this component appears in. Once the correlation block receives a detection event for a particular component, all the nodes in the corresponding column are checked to determine (1) whether the detection of this RegEx is in progress, and (2) which component is expected next. The exemplary look-ahead detection flow satisfies certain timing constraints. Only when the detection of contents with the proper timing is confirmed, is the next node activated. To determine this, each node has a static pointer to its next node.

In the example illustrated by FIGS. 8A-8D, there are two RegEx(es) in the RegEx set; namely, ($r_1$) RegEx1 (abc[a-z] op: $S_1V_1S_2$) and ($r_4$) RegEx4 (abd[^x]{3}xyz: $S_1V_2S_3$). After reordering the RegExes accordingly (RegEx1: $S_1S_2V_1$ and RegEx4: $S_1S_3V_2$), the nodes corresponding to the simple strings are set in the correlation block along with pertinent node information. RegEx1 and RegEx4 contain the same component, simple string $S_1$. Two nodes are examined once $S_1$ is detected. (See FIG. 8A.) When the nodes corresponding to $S_1$ are activated as indicated by a set bit in the node and string $S_1$ is detected, then a node transition occurs to the next node corresponding to the next component in the given RegEx. (See FIG. 8B.)

The sequence of input character and arrival time is discussed below along with the two example RegExes; RegEx1 and RegEx4. The unit of time is defined as the interval required to receive one character. Initially, the active RegEx list is as shown in FIG. 8A. As shown, nodes are represented as boxes containing a "0" or "1". A node containing a "0" is inactive, while a node containing a "1" is active. A received event is processed only when the target state is active. Otherwise (inactive case) the event will be ignored. The first component of every RegEx is always active to start the state transition (otherwise state transition never occurs/starts). For instance, as illustrated in FIG. 8A, the simple string, $S_1$: "abc" is the first component in both RegEx1 and RegEx4. Therefore, they are always active to start the detection of these RegExes, once $S_1$ is detected.

Figure 8D:
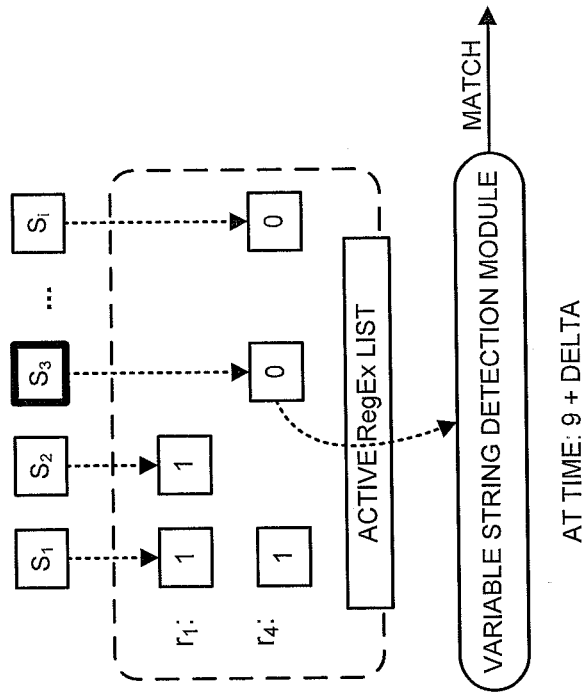

Upon detecting the simple string, $S_1$: "abc" at time 3 (See FIG. 8B.), the simple-string detector (not shown in FIGS. 8A-8D) generates an event and passes it to the correlation block. When the event is received, based on the RegEx stored in the node, the next simple string, $S_2$: "op" of RegEx1 and $S_3$: "xyz" of RegEx4 is activated by setting the bit corresponding to RegEx1 and RegEx4 to active "1" as shown in FIG. 8B.

Figure 8C:
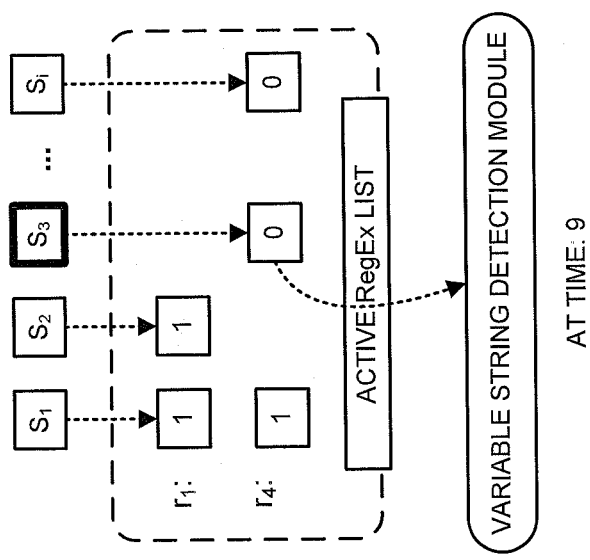

Next, at time 9, $S_3$ is detected and the detection time of $S_3$ is verified based on the distance between $S_3$ and $S_1$. If the timing verification is successful then, as illustrated in FIG. 8C, a query is sent to the variable string detection module to verify the RegEx component $V_2$. The processing time of the detection module is denoted by $\Delta$. Hence, after finishing the processing and successful verification by the detection module, a RegEx match is generated as shown in FIG. 8D.

The RegEx detection is performed on the exemplary LaFA data structure that was constructed using the procedure described in the previous section. An exemplary process for the detection procedure provided here:

```
1:   LaFA (Input Event)
2:   if (The node is active) then
3:       [verify detection timing]
4:       for (Number of Lookup Nodes) do
5:           if (Buffered Lookup) then
6:               [Access one of special modules and verify]
7:           end if
8:           if (In-Line Lookup) then
9:               [Set RegEx detection pattern in an in-line module]
10:          end if
11:      end for
12:      if (All Lookup Matched) then
13:          if (Following Simple-String Node Exist) then
14:              [Activate next simple-string node]
15:          else
16:              [generate match signal]
17:          end if
18:      end if
19:  end if
```

4.2.2 Reordering Strings Using Optimization Policies

As mentioned above, in order to achieve a highly optimized RegEx detection system, it is important to use optimization policies when configuring the LaFA state machine. The proposed LaFA scheme achieves such a highly optimized system by identifying simple strings and variable strings from a set of given RegEx(es), and subsequently reordering such components according to the set of optimization policies. Based on the resulted reordering of components, a state machine is configured accordingly, thereby allowing a highly optimized regular expression detection system to be produced.

The reordering of a RegEx depends on whether the RegEx includes any look-ahead type variable strings denoted as $V_{la}$. Consider, for example, the following cases.

Case 1:

If a RegEx includes only simple strings S and look-ahead type variable string(s) $V_{la}$, then the rule for reordering is as follows. Examining each component and starting from the first component (leftmost component) of the RegEx and moving/scanning towards the right components, for every variable string $V_{la}$ (or group of adjacent $V_{la}$ only) that is directly followed by a simple string S, a swap in component positions between the encountered $V_{la}$ (or group of adjacent $V_{la}$ only) and the directly following simple string S shall be performed, resulting in a reordered RegEx.

As an example given for the above case 1, consider the regular expression: RegEx: abc[a-z]xyz[0-9]op→$S_1$: abc, $V_1$: [a-z], $S_2$: xyz, $V_2$: [0-9], $S_3$: op→RegEx: $S_1V_1S_2V_2S_3$. Note that $V_1$ and $V_2$ are look-ahead-type variable strings. Then, applying the reordering rule of case 1, discussed above, to the RegEx: $S_1V_1S_2V_2S_3$→results in the reordered RegEx: $S_1S_2V_1S_3V_2$.

The information obtained from this reordered RegEx is used for configuring the LaFA state machine, such as configuring the nodes and their information in the correlation block. (See FIGS. 5 and 8A-8D.) Note that the simple strings $S_2$ and $S_3$ are to be detected ahead of the variable strings $V_1$ and $V_2$ in accordance with the look-ahead notion of the LaFA system.

Case 2:

If a RegEx includes simple strings S and "sequential type" variable string(s) $V_{seq}$ only, then the RegEx are not reordered. For example, the RegEx: abc[a-z]{3}op→$S_1$: abc, $V_3$: [a-z]{3}, $S_3$: op→RegEx: $S_1V_3S_3$ should not be reordered since the $V_3$ is a sequential type variable string $V_{seq}$. The information obtained directly from this RegEx (non-reordered) is used for configuring the LaFA state machine such as configuring the nodes and their information in the correlation block.

Case 3:

If a RegEx includes simple strings S and both look-ahead type variable string(s) $V_{la}$ and sequential type variable string(s) $V_{seq}$, then the rule for reordering is as follows. Examining each component and starting from the first component (leftmost component) of the RegEx and moving/scanning towards the right components, for every variable string $V_{la}$ (or group of adjacent $V_{la}$ only) that is directly followed by a simple string S or variable string $V_{seq}$, a swap in component positions between the encountered $V_{la}$ (or group of adjacent $V_{la}$ only) and the directly following simple string S or variable string $V_{seq}$ shall be performed, resulting in a reordered RegEx. Basically, case 3 is similar to case 1, with the variable string $V_{seq}$ treated like another simple string S (while applying the rules of case 1).

As an example given for the above case 3, consider the regular expression: RegEx: abc[a-z][a-z]{3}[0-9]{2}op→$S_1$: abc, $V_1$: [a-z], $V_3$: [a-z]{3}, $V_4$: [0-9]{2}, $S_3$: op→RegEx: $S_1V_1V_3V_4S_3$. Note that $V_3$ and $V_4$ are sequential type variable string(s) $V_{seq}$, whereas $V_1$ is a look-ahead type variable string(s) $V_{la}$. Applying the reordering rule of case 3, discussed above, to the RegEx: $S_1V_1V_3V_4S_3$→results in the reordered RegEx: $S_1V_3V_1V_4S_3$.

The information obtained from this reordered RegEx is used for configuring the LaFA state machine such as configuring the nodes and their information in the correlation block. (See FIGS. 5 and 8A-8D.) Note that variable string $V_3$ is to be detected ahead of the variable strings $V_1$ in accordance with the look-ahead notion of the LaFA system.

It is worth noting that variable strings $V_{la}$ and $V_{seq}$ may be further classified into subtypes of variable strings (which will be provided as a table below). The exemplary LaFA system identifies the subtype of variable strings in a RegEx. These subtypes belong either to the $V_{la}$ or $V_{seq}$ of variable strings. The LaFA system subsequently reorders the RegEx as discussed with the cases provided above. Information, such as component type (simple string or variable string), variable string subtype (belonging to $V_{la}$ or $V_{seq}$), and any reordered components of a RegEx are used when configuring elements of the exemplary LaFA system.

4.2.3 Architecture and Configuration of the Detection Block for Checking an Input String Against Regular Expressions As mentioned previously, a RegEx set is partitioned into simple strings and variable strings. Simple strings are detected using simple-string detectors 530 within the detection module 510, whereas variable strings are detected using a variable string detector 540 within the detection module 510. (Recall FIG. 5.) Also the variable string detector 540 within the detection block 510 may include two main types of modules based on the detection approach in the LaFA architecture: (1) buffered lookup modules; and (2) inline lookup modules. The buffered lookup modules are used for detecting look-ahead type variable strings ($V_{la}$) whereas the in-line lookup modules are used for detecting sequential type variable strings ($V_{seq}$). Each type of lookup module is described in more detail below.

Since a wide variety of variable strings exists, in at least some exemplary embodiments consistent with the present invention, they are further classified into eight subtypes of components as shown in Table 1 below. Each subtype has a qualifier symbol next to the letter V as shown in the first column of Table 1. An example of each type is provided in the right-most column of the table. Each component is also assigned a unique ID, but components that are exactly the same are assigned the same ID even if they belong to different RegExes. Next, various detection modules will be described based on the buffered lookup approach. Referring back to FIG. 3B, different optimized modules may be used to detect different string types.

TABLE 1

| Symbol | Component type | Example |
|---|---|---|
| $V_A$ | Character class (CC) | [a-z], \w |
| $V_B$ | Negated CC | [^a-z], [\W] |
| $V_C$ | Negated character | [^a], [^\n] |
| $V_D$ | Character repetition | [\n]{3, 10} |
| $V_E$ | Simple string repetition | abcd{3, 10} |
| $V_F$ | CC repetition | [a-z]{3, 10}, [\w]{3, 10} |
| $V_G$ | Negated CC repetition | [^a-z]{3, 10}, [\W]{3, 10} |
| $V_H$ | Negated character repetition | [^a]{3, 10} |

4.2.3.1 Timestamps Lookup Module ("TLM")

The buffered lookup modules are useful detection modules in the LaFA architecture. The look-ahead operation can be realized by these modules. These modules use history stored in buffers to verify past activity. A TLM stores the incoming character with respect to its time of arrival. This module can detect non-repetition types of variable strings, such as $V_A$, $V_B$, and $V_C$ (character class, negated character class and negated character). The TLM may incorporate an input buffer, which stores characters recently received from a packet in chronological order. Using this buffer, the TLM can answer queries such as "Does the character at time t belong to a (negated) character class C?". For instance, consider the detection process of RegEx1: abc[a-z]op as an example, and assume the input "abcxop". For the detection of RegEx1, a lowercase alphabetical character (i.e., from a to z) must be detected between simple strings "abc" and "op". Detection of a simple string "op" is a trigger to access the TLM buffer memory and verify the character fetched for a particular time (one character before character "0" in this example) against the one received at the input:

RegEx1: abc[a-z]op|$S_1V_1S_2$
Input: a b c x o p
Timer: 1 2 $\bar{3}$ $\bar{4}$ 5 6

Also, assume for the time being that detection sequence and detection timing have already been verified by the correlation block. The last portion that needs to be verified is whether the input character between "abc" and "op" (i.e., the input character at time 4) was a lowercase alphabetical character or not. In the example above, it can be seen that since at time 4 a lowercase letter "x" appears in the input, RegEx1 is detected.

In a formal notation, let $T_{TLM}=(T_1, T_2, T_3 \ldots T_l)$ be an ordered set of the TLM contents while l is the length of the character buffer. In the example, variable string [a-z] is located at time 4. Receiving character in time 4 is verified. The query is in a statement in the form of "[a, z]$\cap T_4 \neq 0$" to check for its validity.

4.2.3.2 Character Lookup Module ("CLM")

A CLM is responsible for the detection of $V_H$ type (negated character repetition) variable strings. This is one type of variable string that causes traditional FAs to degrade to impractical architectures. An example follows to illustrate the detection procedure of the CLM using RegEx5: abc[^x]{3,5}op and assuming the input "abcdefxop":

RegEx5: abc[^x]{3,5}op|$S_1V_2S_2$
Input: a b c d e f x o p
Time: 1 2 3 $\bar{4}$ $\bar{5}$ $\bar{6}$ $\bar{7}$ 8 9

Also assume that the detection order and timing have already been verified at the correlation block. The CLM has multiple memory locations to store detection timestamps of each character of the input. For example, the first character "a" of the input is detected at time 1, so timestamp 1 is stored for character "a". Timestamp 2 will be stored for character "b", and so on. To match the input to RegEx5, character "x" should not appear from time 4 to time 7. Assume that this time period is to be called the "inviolable period". To verify that information, the CLM uses timestamps stored previously. In the example above, "x" was detected at time 7 and the time is stored at character timestamp memory in the CLM. From the above information, it is clear that the example input "abcdefxop" does not match RegEx5 because "x" was detected during the inviolable period at time 7.

In a formal notation of the ASCII values, let $C_{CLM}=\{C_0, C_1, \ldots C_i\}$ (i can be 0 to 255) be an unordered set. Some components can be empty ($C_x=0$). Each element $C_x$ stores timestamps (e.g., $C_{120}=\{t_6\}$ shows component $C_{120}$ (lowercase "x") appeared at time 6). The query is in a statement in the form of "Is $[t_4, t_6] \cap C_{120}=0$" to check for its validity.

For some RegExes, more than one timestamp needs to be stored per ASCII character. To clarify this need, consider the following example:

RegEx6: abc[^x]{3}xyz|$S_1V_4S_3$
Input: a b c x x x x y z
Time: 1 2 3 $\bar{4}$ $\bar{5}$ $\bar{6}$ $\bar{7}$ 8 9

This example illustrates a situation that requires more than one timestamp entry. Character "x" appears four times at times 4, 5, 6, and 7. The CLM stores the timestamps. However, timestamps 4, 5, and 6 are overwritten and only timestamp 7 is stored because only one timestamp entry is assigned. In this situation, RegEx6 element [^x]{3} cannot be verified correctly. At least two timestamp entries must be reserved in CLM for this example RegEx6.

4.2.3.3 Repetition Detection Module ("RDM")

An RDM is an in-line lookup module used for detecting sequential-type variable strings $V_{seq}$. The RDM is responsible for detecting repetitions that are not detected by the CLM (variable strings of type $V_D$, $V_E$, $V_F$, and $V_G$ (character repetition, simple string repetition, character class repetition and negated character class repetition)). More formally, RDM detects components in the form base{x,y} by accepting consecutive repetitions of the base, x to y times in the input. Here, base can be a single character, a character class, or a simple string. The {x,y} shows a range of repetition, where x is the minimum and y is the maximum repetitions. The RDM is the only inline detection module. The RDM includes several identical sub-modules, and each sub-module can detect character classes and negated character classes with repetitions. These sub-modules operate in an on-demand manner.

Assume a RegEx detection process is in progress and the following component to be inspected is a character class or negated character class repetition. The correlation block sends a request to the RDM for the detection of this component. The request consists of Base ID and the Minimum and Maximum repetition boundaries, where the base is represented by a Pattern ID. The RDM assigns one of the available sub-modules for detecting this component. The assigned sub-module then inspects the corresponding input characters to see whether they all belong to the base range and if the number of repetitions is between the minimum and maximum repetition boundaries. Once the number of repetitions reaches the minimum repetition value, a next simple string is activated. The next simple string is inactivated when number of repetitions reaches the maximum repetition value.

As an example of the RDM detection procedures, consider an example of detecting RegEx7: abc[a-z]{3,5}op against the character input "abcxxxxop".

RegEx7: abc[a-z]{3,5}op|$S_1V_3S_2$
Input: a b c x x x x o p
Time: 1 2 3 $\bar{4}$ $\bar{5}$ $\bar{6}$ $\bar{7}$ 8 9

At time 3, simple string $S_1$: "abc" is detected. The following repetition component [a-z]{3,5} is programmed in the RDM sub-module immediately and starts checking the input character. From time 4 to time 6 consecutively, the module receives three characters that match the base ([a-z]). Therefore, the minimum repetition value is satisfied and subsequently the sub-module sends an activate signal to the next component (simple string $S_2$). Now simple string $S_2$: "op" is ready to receive an event. However, this is still not the end. The sub-module continues checking the input characters. The following characters continuously match the base until the maximum repetition value is reached (i.e., $V_3$ is detected). If there is no match in this interval, the sub-module deactivates the next component ($S_2$: "op" in the example case). However, in the given example all components are detected and the input matched the RegEx7.

An optimized module that may be used to improved the performance of the RDM is described in §4.2.3.3.1 below.

4.2.3.3.1 Frequently Appearing Repetition Detection Module ("FRM")

In practice, there are frequently used repetition bases (frequent bases). This creates an opportunity for sharing the detection effort for these frequent bases, further reducing resource usage. A frequently appearing repetition detection module ("FRM") can detect any type of repetition using a buffered lookup approach (variable strings of type $V_D$, $V_E$, $V_F$, $V_G$). When analyzing the RegEx sets, popularity of base in the RegEx set is ranked. For instance, [^\n\r] is the base that most frequently appears in the Snort RegEx set. Both FRM and RDM verify repetition components, but FRM can be shared among multiple RegExes. This improves resource efficiency.

Thus, in the configuration phase, popular bases may be programmed in FRMs rather then RDMs. The base is programmed in memory, so updating the base does not require logic modification. Each FRM has a counter that counts the number of consecutive input characters/simple strings that match the base. When the sequence breaks, the count and timestamp are stored in a history memory inside of the FRM. Thus, for the query operation, repetition behavior can be found in a particular time range from the number of repetitions with the timestamp.

4.2.3.4 Short Simple String Detection Module ("SDM")

Referring to the left column of FIG. 3B, some exemplary embodiments employing LaFA may classify simple strings even further as "regular" or "normal" simple strings (referred to as "normal simple strings") and "short simple strings". Short strings are classified as "shallow" components. (See FIGS. 3A and 3B.) Shorter strings naturally are more likely to generate more "events" as described in the following section. To reduce occurrence of events generated by the simple string, some exemplary embodiments employing LaFA may use another buffered lookup type of module called Short Simple String Detection Module ("SDM"). To maximize the advantage of the event-based detection approach, it is useful to select an appropriate signature size (the number of characters in a simple string signature). If one imagines that the signature table in the simple string detector contains many one character signatures, then a simple-string detector may generate an event for every single character input. (This is the reason that traditional RegEx detection architectures suffer.) Assume all characters arrive with the same probability and the signature table has s kinds of signatures. The probability to generate an event by receiving one character is $$\frac{s}{256}.$$

The probability will be reduced exponentially, $$\frac{s}{256^l}$$

as the number of characters, l, increases. Strings with at least a predetermined number (e.g., length=5) characters may be classified as a "normal simple strings", and strings with less than that may be classified as a "short simple strings".

4.3 Checking an Input String Against Regular Expressions for a Match Using Configured State Machines FIG. 14, which includes FIGS. 14A-14C, illustrates a flow diagram of an exemplary string matching method 1400, consistent with the present invention. (Recall method 700 of FIG. 7 and operation 140 of FIG. 1.) Referring first to FIG. 14A, an input character string is received and provided to a simple string detector. (Blocks 1402 and 1404) Referring to event block 1406, if a match is received from the simple string detector, the exemplary method 1400 continues to FIG. 14B via "A" 1408. (Recall, for example, 535a of FIG. 5. The other event is described later.)

Referring to FIG. 14B, as indicated by the loop 1412-1432, a number of acts are performed for each node corresponding to the matched simple string. More specifically, it is first determined if the node is active. (Block 1414) If not, the method 1400 proceeds to 1432 where it is determined whether or not there is another node corresponding to the matched simple string. Referring back to decision block 1414, if, on the other hand, it is determined that the node is active, then the timing is checked using the time range information (minimum time and maximum time) stored in the node. (Block 1416) If the timing is not valid, then the violation type (e.g., <minimum or >maximum) is determined. If the timing violation is because the time is less than the minimum time value stored, the exemplary method 1400 proceeds to block 1432 (already discussed). If, on the other hand, the timing violation is because the time is greater than the maximum time value stored, the exemplary method 1400 determines if the node is the first node of the regular expression. (Decision block 1422) If so, the exemplary method 1400 proceeds to block 1432 (already discussed); otherwise the exemplary method 1400 deactivates the node (Block 1424) before proceeding to block 1432.

Referring back to decision block 1418, if the timing is valid, then it is determined whether or not the node is the first node of the regular expression. If not, the node is deactivated (Block 1428) before the exemplary method 1400 proceeds to block 1430; otherwise, the exemplary method 1400 proceeds directly to block 1430. At block 1430, the method 1400 activates the node identified by a stored pointer (and any necessary information is passed from the current node to the node identified by the pointer). The exemplary method then proceeds to 1432.

At 1432, it is determined if there are any more nodes corresponding to the matched simple string. If so, the method 1400 loops back to 1412; otherwise, the method is left. (Via return 1434)

Referring to both block 1430 of FIG. 14B and event block 1406 of FIG. 14A (as well as block 1460 of FIG. 14C, to be discussed below), if a node is activated by another node (Recall, e.g., 535b of FIG. 5.), the exemplary method 1400 continues to FIG. 14C via "B" 1410. First, it is determined whether the activated node is a sequential string node. (Decision block 1440) If so, the method 1400 is left. (Return 1434). Otherwise, the exemplary method 1400 then determines a module identifier stored in the activated node. (Block 1442) As indicated by block 1444, various branches of the exemplary method 1400 are performed depending upon the module identifier determined. More specifically, if the module identifier identifies the TLM, the exemplary method 1400 queries the TLM with information stored in the activated node and information (e.g., time stamp of detection) passed from the node that activated the activated node, before the method 1400 continues to decision block 1456 (described later). (Block 1446) If, however, the module identifier identifies the CLM, the exemplary method 1400 queries the CLM with information stored in the activated node and information (e.g., time stamp of detection) passed from the node that activated the activated node, before the method 1400 continues to decision block 1456 (described later). (Block 1448) If, however, the module identifier identifies the RDM, the exemplary method 1400 queries the RDM with information stored in the activated node and information (e.g., time stamp of detection) passed from the node that activated the activated node, before the method 1400 continues to decision block 1456 (described later). (Block 1450) If, however, the module identifier identifies the FRM, the exemplary method 1400 queries the FRM with information stored in the activated node and information (e.g., time stamp of detection) passed from the node that activated the activated node, before the method 1400 continues to decision block 1456 (described later). (Block 1452) Finally, if the module identifier identifies the SDM, the exemplary method 1400 queries the SDM with information stored in the activated node and information (e.g., time stamp of detection) passed from the node that activated the activated node, before the method 1400 continues to decision block 1456 (described later). (Block 1454) Note that exemplary TLMs, CLMs, RDMs, FRMs and SDMs were described in §4.3.2 above.

Referring to decision block 1456, it is determined whether the response to the query has been received. If not, the exemplary method 1400 may loop back to wait. Otherwise, if the query response is received, it is determined whether or not the query response is positive. (Decision block 1458) If not, the exemplary method 1400 is left. (Via return 1434) Otherwise (if the query response is positive), then the node identified by the currently active node's pointer is activated, and any necessary information is passed form the currently active node to the newly activated node (Block 1460) before the method 1400 is left. (Return 1434) Note that the node activation at block 1462 will trigger an event indicating a node activated by another node. (Event block 1406 of FIG. 14A)

4.3.1 Examples of Operations

Figure 9A:
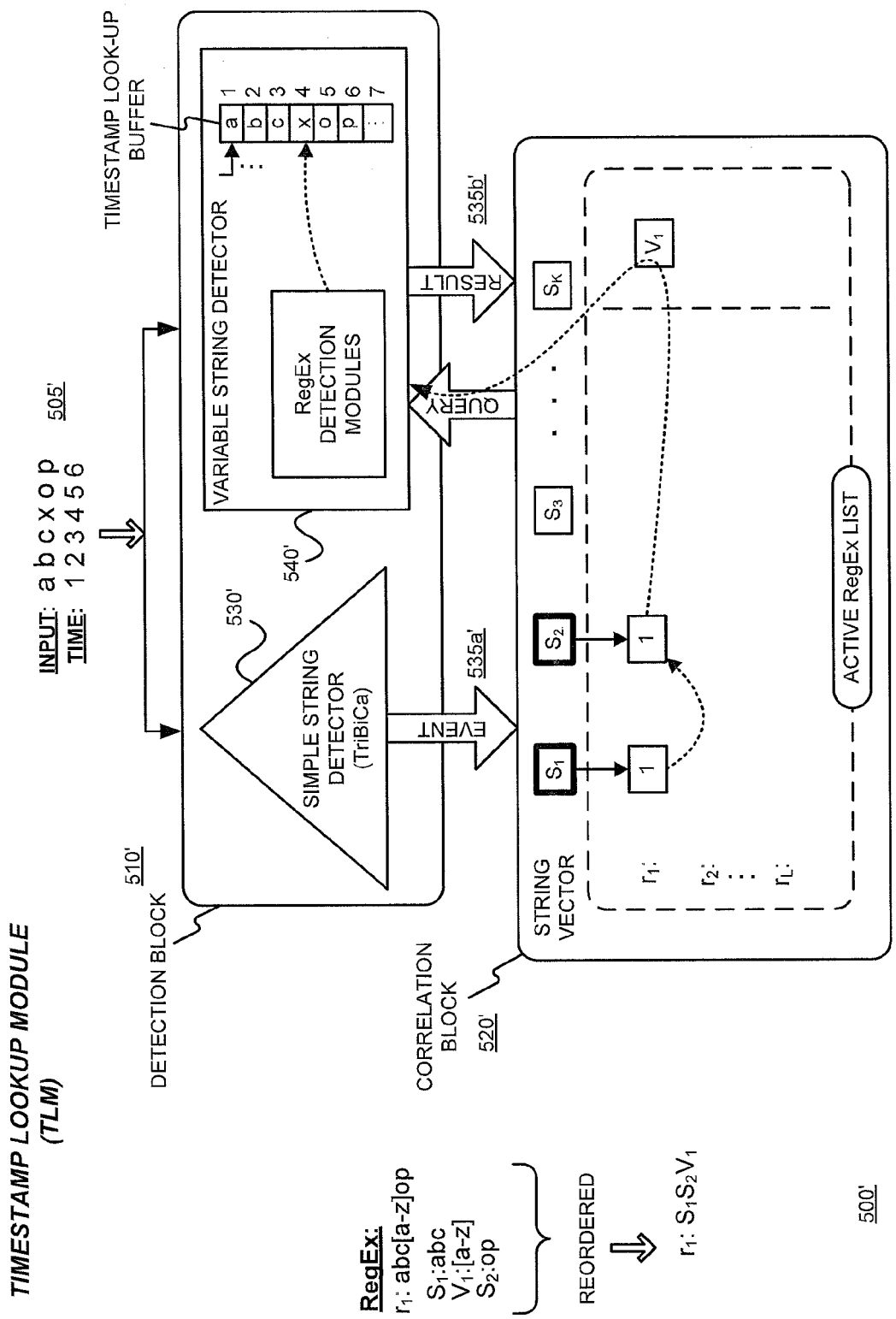
FIGS. 9A-9C illustrate configured LaFA state machine detection systems consistent with the present invention in which arbitrary input strings are checked for a match against regular expressions.
Figure 9B:
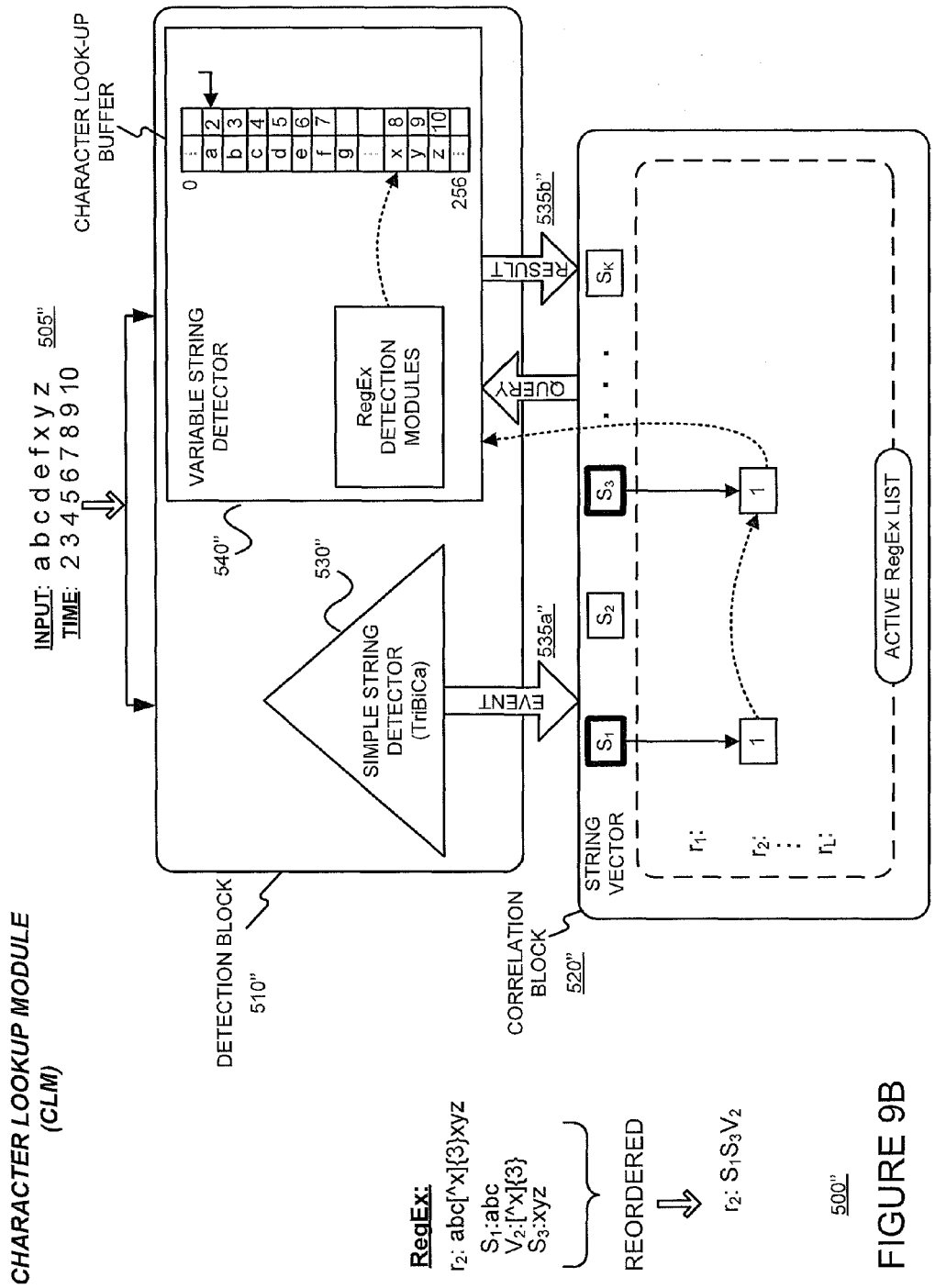
Figure 9C:
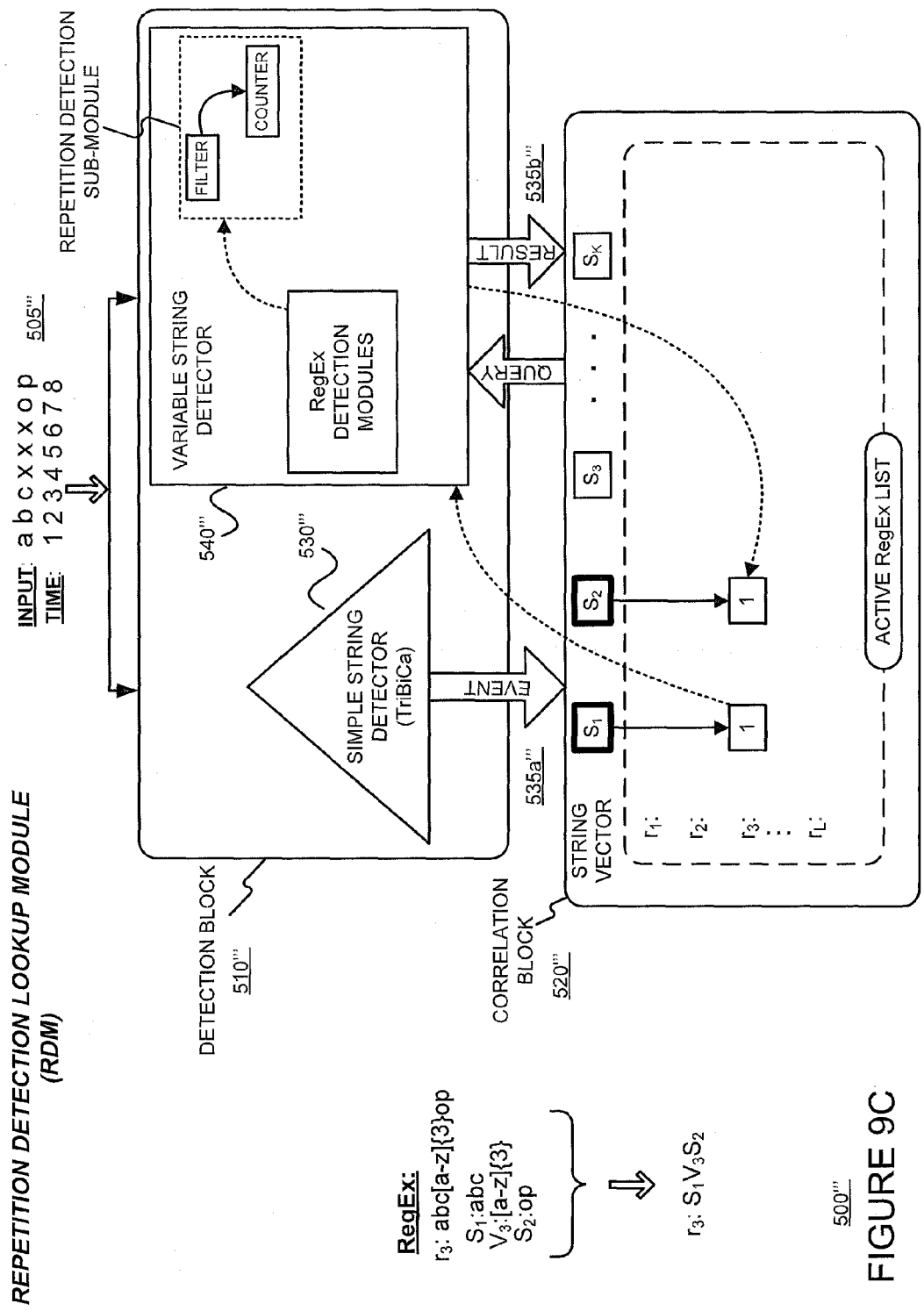

FIGS. 9A-9C illustrate configured LaFA state machine detection systems 500', 500", 500''', wherein arbitrary input strings are checked for a match against regular expressions. In particular, LaFA detection systems using TLM, CLM and RDM detection modules, respectively, are illustrated.

FIG. 9A illustrates a configured LaFA detection system employing a TLM buffered lookup-module wherein an input string: "abcxop" is checked against ($r_1$) RegEx1: abc[a-z]op. The input string is inserted in the detection block 510' wherein both the simple string detector (e.g., a TriBiCa detector, such as those described in U.S. patent application Ser. No. 11/978,216 (which issued as U.S. Pat. No. 7,805,460 on Sep. 28, 2010) and Ser. No. 11/978,185, both incorporated herein by reference) 530' and the variable string detector 540' receive the input "abcxop" 505'. The node corresponding to $S_1$ has been activated and awaiting a match. At time 3, the simple string detector 530' has detected simple string $S_1$: "abc" and an event 535a' is generated notifying the match to the correlation block 520'. Next, the node corresponding to the simple string $S_2$: "op" is activated and awaiting a match. At time 6, the simple string detector 530' has detected simple string $S_2$ and an event 535a' is generated notifying the match to the correlation block 520'. Next, since $S_2$ has been detected, the correlation block 520' must query the variable string detector 540' to determine if variable string $V_1$ has been detected at the appropriate time, namely time 4. Note, that the correlation block 520' includes nodes having information such as: (1) a pointer to the next state; (2) the status of the current state; (3) detection timing values (e.g., minimum time (distance) and maximum time (distance)); (4) module ID; (5) component ID; (6) minimum repetition; and (7) maximum repetition. Such information is used to verify the correct component detection at the correct timing. The variable string detector 540' in this example employs a TLM detector module for the given RegEx1. The TLM module stores the incoming character with respect to its time of arrival as illustrated in the variable string detector of the detection block. The TLM module checks the buffer and confirms that the lowercase character "x" appears at time 4. Hence, $V_1$: "[a-z]" is satisfied and the detection block 510' sends the results to the correlation block wherein a match is finally confirmed.

FIG. 9B illustrates a configured LaFA detection system 500" employing a CLM buffered lookup-module wherein an input string: "abcdefxyz" 505" is checked against ($r_2$) RegEx2: abc[^x]{3}xyz. The input string 505" is inserted in the detection block 510" wherein both the simple string detector (e.g., a TriBiCa detector) 530" and the variable string detector 540" receive the input "abcdefxyz" 505". The node corresponding to $S_1$ has been activated and awaiting a match. At time 3, the simple string detector 530" has detected simple string $S_1$: "abc" and an event 535a" is generated notifying the match to the correlation block 520". Next, the node corresponding to the simple string $S_3$: "xyz" is activated and awaiting a match. At time 9, the simple string detector 530" has detected simple string $S_3$ and an event 535a" is generated notifying the match to the correlation block 520". Next, since $S_3$ has been detected, the correlation block 520" must query the variable string detector 540" to determine if variable string $V_2$ has been detected at the appropriate time (namely character "x" should not appear from time 4 to time 6). Note, that the correlation block 520" comprises nodes having information such as: (1) a pointer to the next state; (2) the status of the current state; (3) detection timing values (e.g., minimum time (distance) and maximum time (distance)); (4) module ID; (5) component ID; (6) minimum repetition; and (7) maximum repetition. Such information is used to verify the correct component detection at the correct timing. The variable string detector in this example case employs a CLM detector module for the given RegEx2. The CLM module has multiple memory locations to store detection timestamps of each character of the input as illustrated in the variable string detector of the detection block. The CLM module checks the buffer and confirms that the lowercase character "x" does not appears at from time 4 to time 6. In particular, the CLM module determines from the character look-up buffer that "x" was detected at time. Hence, $V_2$: "[^x]{3}" is satisfied. The detection block 510" sends the results to the correlation block 520", where a match is finally confirmed.

FIG. 9C illustrates a configured LaFA detection system 500''' employing a RDM in-line lookup-module wherein an input string: "abcxxxop" 505''' is checked against ($r_3$) RegEx3: abc[a-z]{3}op. The input string 505''' is inserted in the detection block 510''' wherein both the simple string detector (e.g., a TriBiCa detector) 530''' and the variable string detector 540''' receive the input "abcxxxop" 505'''. The node corresponding to $S_1$ has been activated and awaiting a match. At time 3, the simple string detector 530''' has detected simple string $S_1$: "abc" and an event 535a''' is generated notifying the match to the correlation block 520'''. Note that RegEx3: abc[a-z]{3}op has a $V_{seq}$-type variable string $V_3$: "[a-z]{3}" only. Therefore, RegEx3 cannot be reordered and a "look-ahead" cannot be employed. Next, since $S_1$ has been detected, the correlation block 520''' queries the variable string detector 540''' to determine if the $V_3$ has been detected. Note, that the correlation block 520''' includes nodes having information such as: (1) a pointer to the next state; (2) the status of the current state; (3) detection timing values (e.g., minimum time (distance) and maximum time (distance)); (4) module ID; (5) component ID; (6) minimum repetition; and (7) maximum repetition. Such information is used to verify the correct component detection at the correct timing. The variable string detector 540''' in this example case employs an RDM detector module for the given RegEx1. The repetition detection sub-module in the variable string detector checks the incoming input characters in order to verify $V_3$: "[a-z]{3}". Since, the input character "x" repeats 3 times at times 4, 5 and 6, component $V_3$ is verified and the detection block 510''' sends the event/results to the correlation block 520''', where the node corresponding to simple string $S_2$ is activated and awaiting a match. Next, at time 8, the simple string detector 530''' has detected simple string $S_2$: "op" and an event 535*a'''* is generated, notifying the match to the correlation block 520''' where a match between the input and RegEx3 is finally confirmed.

4.4 Exemplary Apparatus

Figure 10:
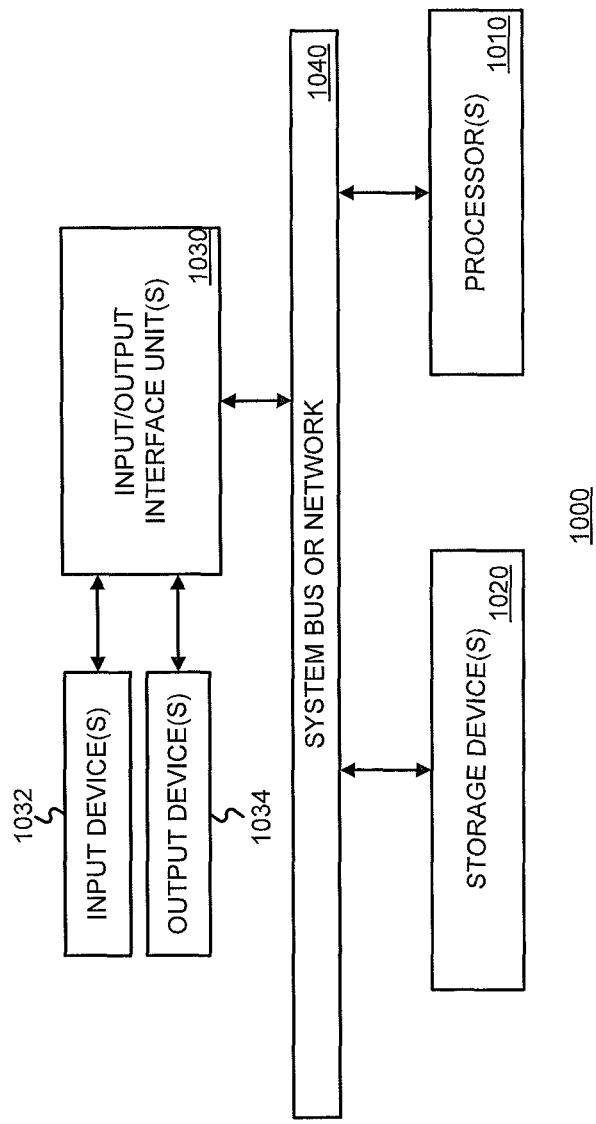
FIG. 10 is a block diagram of an exemplary apparatus consistent with the present invention that may perform various operations, and store various information generated and/or used by such operations.

FIG. 10 is high-level block diagram of a machine 1000 that may perform one or more of the processes described above, and/or store information used and/or generated by such processes. The machine 1000 basically includes one or more processors 1010, one or more input/output interface units 1030, one or more storage devices 1020, and one or more system buses and/or networks 1040 for facilitating the communication of information among the coupled elements. One or more input devices 1032 and one or more output devices 1034 may be coupled with the one or more input/output interfaces 1030. The one or more processors 1010 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to effect one or more aspects of the present invention. At least a portion of the machine executable instructions may be stored (temporarily or more permanently) on the one or more storage devices 1020 and/or may be received from an external source via one or more input interface units 1030.

In one embodiment, the machine 1000 may be one or more conventional personal computers, servers, or routers. In this case, the processing units 1010 may be one or more microprocessors. The bus 1040 may include a system bus. The storage devices 1020 may include system memory, such as read only memory (ROM) and/or random access memory (RAM). The storage devices 1020 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 1032, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 1010 through an appropriate interface 1030 coupled to the system bus 1040. The output devices 1034 may include a monitor or other type of display device, which may also be connected to the system bus 1040 via an appropriate interface. In addition to (or instead of) the monitor, the personal computer may include other (peripheral) output devices (not shown), such as speakers and printers for example.

4.6 Refinements, Alternatives and Extensions

4.6.1 Multiple Detection Tracks

Figure 11:
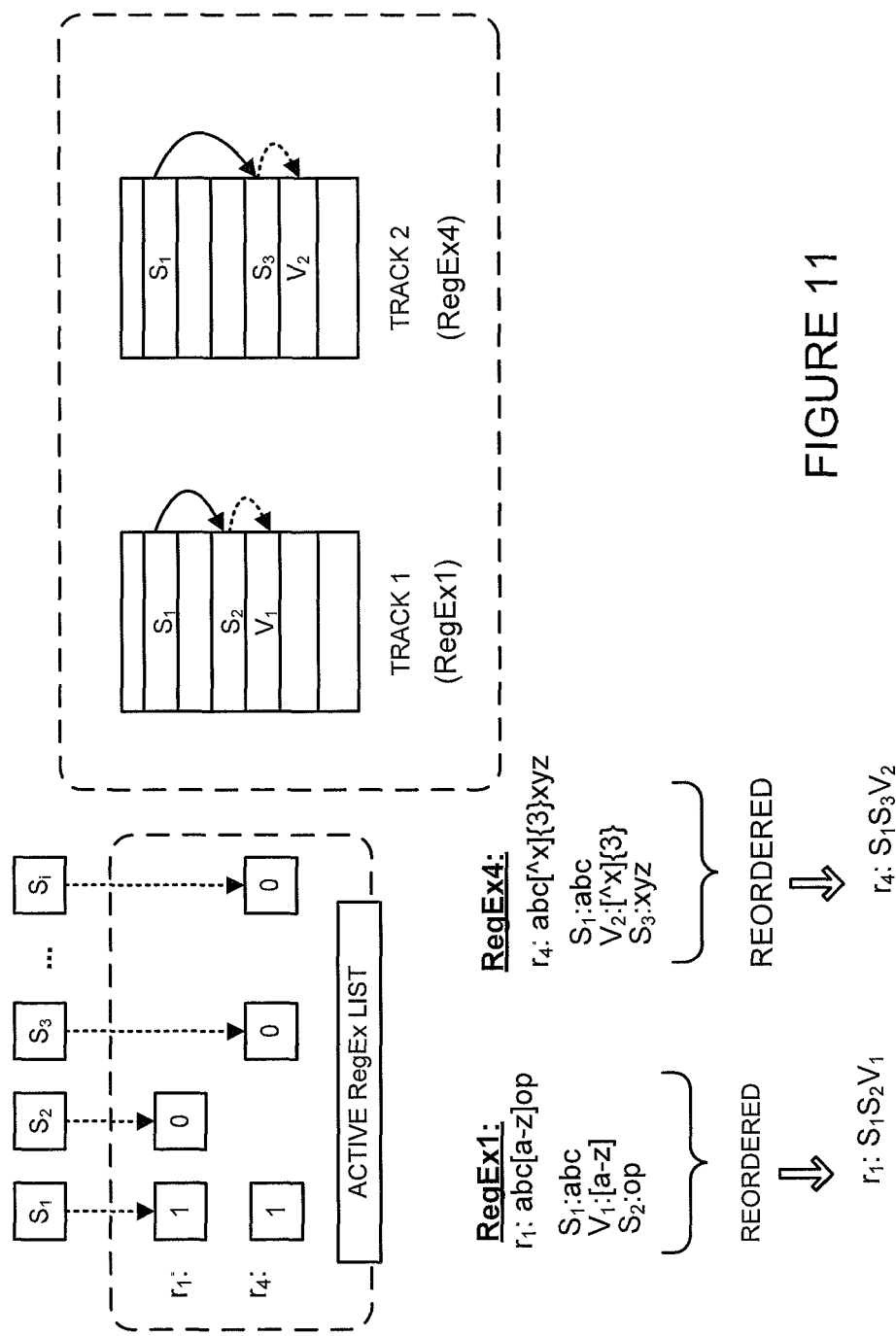
FIG. 11 illustrates tracks of a LaFA architecture consistent with the present invention in which simultaneous detection of multiple regular expressions occurs in parallel.

In the previous sections, the exemplary LaFA data structures and architectures were illustrated with one set of detection modules (a detection block and a correlation block), which is referred to as a "track" in the LaFA architecture. For some large RegEx sets, having more than one track allows constant detection time regardless of the input traffic. As illustrated in FIG. 11, two simultaneous activation processes are invoked for $S_2$ and $S_3$, in response to a detection event of $S_1$. This can slow down the detection speed if those operations are performed sequentially. The LaFA scheme avoids this drawback by spreading the two RegExs, RegEx1 and RegEx4, into two tracks, and performing the detection operation in parallel as shown in FIG. 11. As a result, regardless of the input traffic, the LaFA scheme will always need at most one operation per each track and all tracks work in parallel. FIG. 11 also illustrates how an exemplary LaFA architecture stores component information in a node memory. The nodes of $S_3$ and $V_2$ are stored at consecutive locations in the node memory since they will be verified successively, thereby achieving higher access speeds. Since simple strings like $S_1$ and $S_3$ are independent from each other and any other component, they can be stored anywhere in the memory. Such independent nodes are stored in a way that helps balance the memory size. Locations of simple strings are resolved by pointers.

4.6.2 Block Detection Optimization

In this section, an optimized detection method referred to as "block detection" is described. Using block detection can reduce bottlenecks due to multiple concurrent operations significantly, and can also reduce requirements of node information memories. FIG. 12A illustrates three RegExes and FIG. 12B shows the same RegExes in LaFA notation. All the RegExes in this example start with $S_7$ followed by $V_4$. The detection of $S_7$ activates three simple strings, $S_8$, $S_9$, and $S_{10}$, and causes multiple concurrent activation operations. In FIG. 12B, the three RegExes share the same components, back-to-back, ($S_7$ and $V_4$). This is represented as $B_1$ (a buffered lookup type) in FIG. 12C. Assume that this pair of components is called block $B_1$, and that the detection sequence is reordered such that $S_8$, $S_9$, and $S_{10}$ are detected first. Only if $S_8$, $S_9$, or $S_{10}$ is detected then whether $B_1$ is detected is verified. This can be implemented as follows. The detection time of $B_1$ will be stored in a block detection module having the same architecture as a CLM. When the following simple string is detected (for example $S_8$), the $B_1$ is verified. By using in such a detection, three concurrent operations are reduced to one, and the number of tracks can be reduced more than 60% for these RegExes. It is more effective to reduce the concurrent operation at the architecture level so that number of tracks is minimized. However, some exemplary embodiments of LaFA use multiple parallel tracks, with each track having (at most) one operation at any given time.

4.6.3 Time Event

Figures 13A, 13B, 13C:
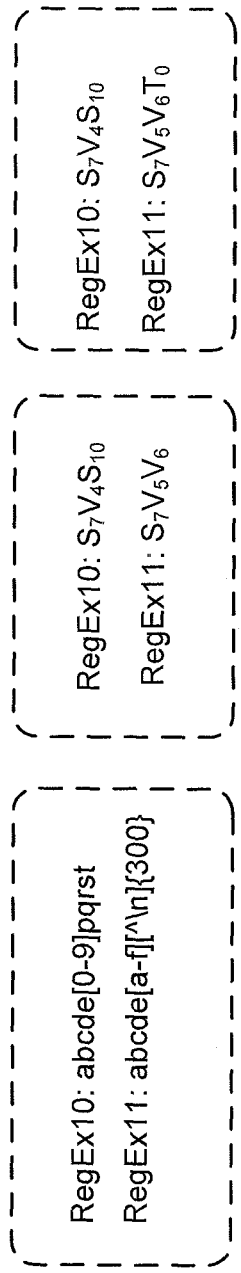
FIGS. 13A-13C illustrate a "time-event" occurrence within a LaFA architecture consistent with the present invention.

FIGS. 13A and 13C illustrate an exemplary LaFA representation of two RegExes—RegEx10 and RegEx11. All variable strings, $V_4$, $V_5$, $V_6$, are buffered lookup type (or $V_{la}$). RegEx10 is a normal case and LaFA can perform verification operations after detecting simple string $S_{10}$. On the other hand, RegEx11 does not have any simple string following to the two variable strings $V_5$, $V_6$, so LaFA does not know the right timing to verify the variable strings. Supporting this type of RegExes, a new type of event, referred to as "time event" and symbolized as $T_o$ in FIG. 13C, is exploited. In the example case, variable strings $V_5$ and $V_6$ need the verification of 3001 character after detection of $S_{10}$, which comes from the sum of the two variable strings, 301 (=1+300). LaFA activates a timer to execute this type of event, after detecting $S_{10}$. The timer generates a time-event after a defined time. At this time, LaFA checks to verify $V_5$ and $V_6$. Even if $V_6$ is not an exact repetition type of a component, LaFA can be configured to issue a time event in minimum repetition timing. If the intermediate variable string (e.g., $V_5$) is not an exact repetition, an in-line lookup module is assigned instead of a buffered lookup to verify the variable string so that this type of RegEx is also supported.

4.6.4 Online Regular Expression Update

An important property of the exemplary LaFA schemes is that they permit fast updates to be made. Traditionally, when a new RegEx is available, the RegEx Detection System should be taken offline and updated with this new RegEx. This requires either deploying another system for backup or leaving the network "open" to attacks during the updates. The former solution is costly, whereas the latter is not secure. Thus, fast online updates are very desirable.

At least some embodiments of LaFA treat each RegEx independently. Thus, updating, deleting, or adding RegExes does not affect the other memory contents or the detection process of any other RegExes. The only places that need to be updated are the simple string detector and a node memory that is related to the RegExes. In addition, offline node construction is performed locally. In DFA-based methods, the data structures are very strongly coupled, so that an update in one RegEx may affect many states/transitions in the DFA. Thus, with DFA, any update has a potential to change most of the data structure, taking longer to complete. In traditional NFA-based approaches, the data structures are hard-coded on the logic gates. Thus, with NFA, any update requires a hardware reconfiguration, which also takes long and performance of the updated logic is not guaranteed. Thus, the update time of LaFA is significantly less than other FA schemes, and LaFA is more flexible with adding new RegExes.

4.7 Conclusions

Embodiments consistent with the present invention provide a novel data structure (namely, a highly optimized "look-ahead" finite automata) which provides a scalable and highly optimized regular expression detection system and which supports low-cost set membership queries. By using such a data structure, matching can be checked at high speed.

What is claimed is:

1. A computer-implemented method for determining whether an input string matches at least one regular expression, the computer implemented method comprising:
   a) accepting, by a processing system including at least one processor, the input string; and
   b) for each of the at least one regular expression, checking, by the processing system, for a match between the input string accepted and the given regular expression using configured nodes of a state machine stored on the processing system, and corresponding to the given regular expression by using the configured nodes of the state machine to (1) check detection events from a simple string detector, (2) submit each of at least one query to a module of a variable string detector, the module being identified by information included in an activated node of the state machine, and (3) receive, for each of the at least one query, a detection event from the identified module of the variable string detector,
   wherein at least one of the nodes includes a time range and a pointer to a next node.

2. The computer-implemented method of claim 1 wherein at least one of the nodes, upon receiving a detection event from one of (A) the simple string detector, or (B) the identified module of the variable string detector, activates a further node identified by a pointer stored in the at least one of the nodes.

3. The computer-implemented method of claim 2 wherein the at least one of the nodes passes information to the further node activated by it.

4. The computer-implemented method of claim 1 wherein at least one of the nodes further includes a pattern being searched for, and a module identifier.

5. The computer-implemented method of claim 1 wherein at least one of the nodes further includes a minimum repetition, a maximum repetition, and a module identifier.

6. The computer-implemented method of claim 1 wherein the at least one processor is a microprocessor.

7. The computer-implemented method of claim 1 wherein the at least one processor is a field programmable gate array.

8. The computer-implemented method of claim 1 wherein the identified module of the variable string detector is a selected one of (A) a time stamp lookup module, (B) a character lookup module, (C) a repetition detection lookup module, and (D) a frequently appearing repetition module.

9. Apparatus for determining whether an input string matches at least one regular expression, the apparatus comprising:
   a) at least one processor; and
   b) a storage device storing processor-executable instructions which, when executed by the at least one processor, perform a method including
      1) accepting the input string, and
      2) for each of the at least one regular expression, checking for a match between the input string accepted and the given regular expression using configured nodes of a state machine corresponding to the given regular expression by using the configured nodes of the state machine to (i) check detection events from a simple string detector, (ii) submit each of at least one query to a module of a variable string detector, the module being identified by information included in an activated node of the state machine, and (iii) receive, for each of the at least one query, a detection event from the identified module of the variable string detector,
      wherein at least one of the nodes includes a time range and a pointer to a next node.

10. The apparatus of claim 9 wherein at least one of the nodes, upon receiving a detection event from one of (A) the simple string detector, or (B) the identified module of the variable string detector, activates a further node identified by a pointer stored in the at least one of the nodes.

11. The apparatus of claim 10 wherein the at least one of the nodes passes information to the further node activated by it.

12. The apparatus of claim 9 wherein at least one of the nodes further includes a pattern being searched for, and a module identifier.

13. The apparatus of claim 9 wherein at least one of the nodes further includes a minimum repetition, a maximum repetition, and a module identifier.

14. The apparatus of claim 9 wherein the at least one processor is a microprocessor.

15. The apparatus of claim 9 wherein the at least one processor is a field programmable gate array.

16. The apparatus of claim 9 wherein the identified module of the variable string detector is a selected one of (A) a time stamp lookup module, (B) a character lookup module, (C) a repetition detection lookup module, and (D) a frequently appearing repetition module.

* * * * *